United States Patent
Nakagawa

(10) Patent No.: US 10,764,737 B2
(45) Date of Patent: Sep. 1, 2020

(54) COMMUNICATION APPARATUS, CONTROL METHOD, AND STORAGE MEDIUM

(71) Applicant: CANON KABUSHIKI KAISHA, Tokyo (JP)

(72) Inventor: Toshiyuki Nakagawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 10 days.

(21) Appl. No.: 16/182,464

(22) Filed: Nov. 6, 2018

(65) Prior Publication Data
US 2019/0166481 A1    May 30, 2019

(30) Foreign Application Priority Data
Nov. 30, 2017   (JP) ................. 2017-229876

(51) Int. Cl.
H04W 84/12     (2009.01)
H04W 8/00      (2009.01)
H04W 76/14     (2018.01)

(52) U.S. Cl.
CPC .......... H04W 8/005 (2013.01); H04W 76/14 (2018.02); *H04W 84/12* (2013.01)

(58) Field of Classification Search
CPC ..... H04W 8/005; H04W 76/14; H04W 84/12; H04W 88/06; H04W 48/16
See application file for complete search history.

(56) References Cited

U.S. PATENT DOCUMENTS

| | | | |
|---|---|---|---|
| 2016/0065667 A1 | 3/2016 | Aoki | |
| 2017/0208030 A1* | 7/2017 | Qi | ................. H04L 45/7453 |
| 2017/0223579 A1* | 8/2017 | Lee | ................. H04W 48/14 |
| 2018/0279138 A1* | 9/2018 | Fan | ................. H04W 24/02 |
| 2019/0014375 A1* | 1/2019 | Liu | ................. H04W 88/02 |
| 2019/0090125 A1* | 3/2019 | Iwami | ................. G06F 13/00 |
| 2019/0215327 A1* | 7/2019 | Murthy | ................. H04L 63/101 |

* cited by examiner

*Primary Examiner* — Mohamed A Kamara
(74) *Attorney, Agent, or Firm* — Canon U.S.A., Inc., IP Division

(57) ABSTRACT

A communication apparatus searches for another communication apparatus using either a method with which to perform direct wireless communication or a method for specifying a service via an apparatus for constructing a wireless network, and in a case where another communication apparatus is using one of the methods and the detected another communication apparatus satisfies a predetermined condition, the communication apparatus does not perform a search using the other method.

15 Claims, 10 Drawing Sheets

COMMUNICATION APPARATUS, CONTROL METHOD, AND STORAGE MEDIUM

BACKGROUND

Field

The present disclosure relates to a search for another communication apparatus by a communication apparatus.

Description of the Related Art

In recent years, the Wi-Fi® Miracast® Release 2 (R2) standard has been formulated by the Wi-Fi® Alliance. In the Wi-Fi® Miracast® R2 standard, a transmission apparatus transmits image data or sound data as information of a screen displayed on or a sound reproduced by the transmission apparatus to a reception apparatus, whereby the transmission apparatus and the reception apparatus can share the displayed screen or the reproduced sound.

The Wi-Fi® Miracast® R2 standard prescribes a peer-to-peer (P2P) search function in which a transmission apparatus or a reception apparatus searches for an opposing device in compliance with the Wi-Fi Direct® standard (the Wi-Fi® Peer-to-Peer specification). The Wi-Fi® Miracast® R2 standard prescribes, in addition to the P2P search function, a basic service set (BSS) search function in which a transmission apparatus or a reception apparatus searches for an opposing device in an infrastructure network.

US2016/0065667 discusses a method in which a communication apparatus searches for an opposing device in compliance with two different wireless communication standards.

In the Wi-Fi® Miracast® R2 standard, in a case where a communication apparatus searches for an opposing device, the communication apparatus can use both the method for searching for the opposing device by the P2P search function and the method for searching for the opposing device by the BSS search function.

If the communication apparatus searches for the opposing device by both search methods, there is the advantage that an opposing device that is not detected by one of the search methods can be detected by the other search method. However, if the communication apparatus always searches for the opposing device by both search methods, the communication apparatus can detect the same opposing device by both search methods. In such a case, there is the disadvantage that power is unnecessarily consumed.

SUMMARY

The present disclosure is directed to improving power saving performance of a communication apparatus that searches for another communication apparatus using a plurality of different search methods by not searching for another communication apparatus by other search methods, in a case where another communication apparatus detected by one of the search methods satisfies a predetermined condition.

According to an aspect of the present disclosure, a communication apparatus includes a first communication unit configured to perform direct wireless communication with another communication apparatus, a second communication unit configured to communicate with another communication apparatus via a construction apparatus for constructing a wireless network, a first search unit configured to search for another communication apparatus with which the first communication unit is to communicate, a second search unit configured to perform a search for another communication apparatus that supports a predetermined service and with which the second communication is to be performed, by performing the search specifying the predetermined service by the second communication unit, and a control unit configured to perform control such that in a case where the communication apparatus searches for another communication apparatus, based on the communication apparatus being connected to the construction apparatus, the search by the second search unit is performed, and based on the communication apparatus not being connected to the construction apparatus, the search by the first search unit is performed, and after the search by the first search unit or second search unit is performed, in a case where another communication apparatus detected by the search satisfies a predetermined condition, the search unit that did not perform the search does not perform any searches, and in a case where another communication apparatus detected by the search does not satisfy the predetermined condition, the search unit that did not perform the search performs a search.

Further features will become apparent from the following description of exemplary embodiments with reference to the attached drawings.

DESCRIPTION OF THE EMBODIMENTS

Exemplary embodiments will be described in detail below with reference to the attached drawings. The configurations illustrated in the following exemplary embodiments are merely illustrative and are not seen to be limiting.

Figure 1:
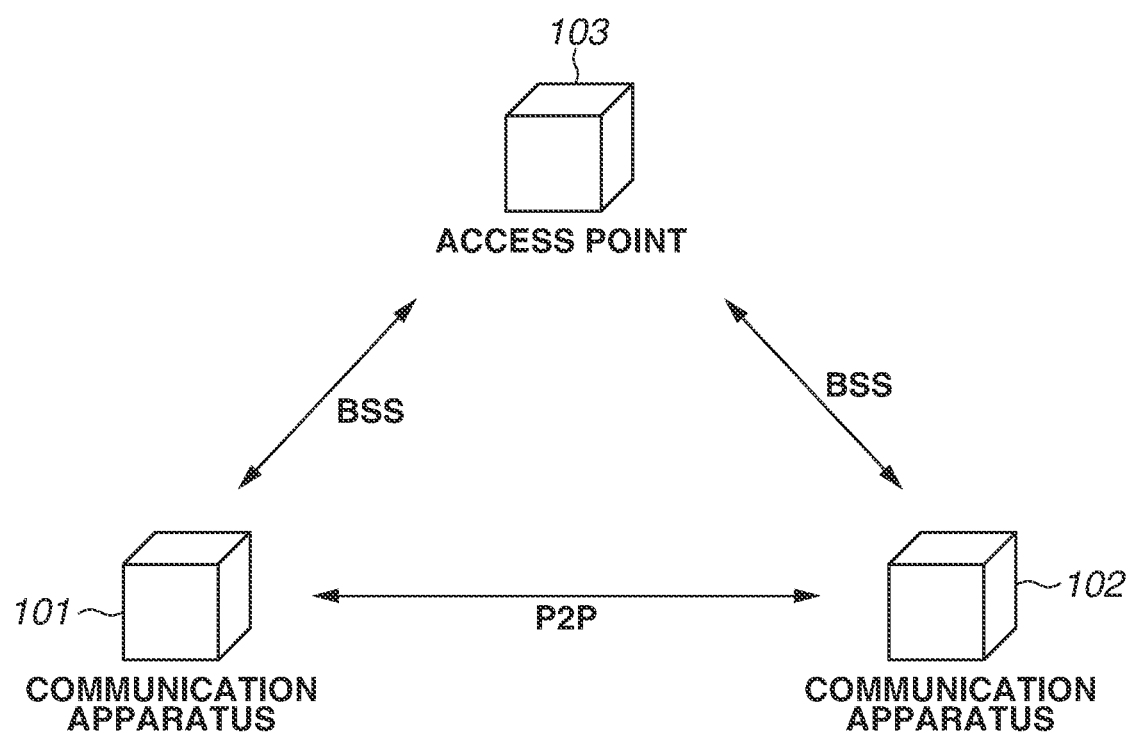
FIG. 1 is a diagram illustrating a network configuration of a network that a communication apparatus joins.

FIG. 1 illustrates the network configuration of a network that a communication apparatus 101 according to a first exemplary embodiment joins. Each apparatus in FIG. 1 performs communication by a wireless communication method compliant with an Institute of Electrical and Electronics Engineers (IEEE) 802.11 series standard.

The communication apparatus 101 performs wireless communication with a communication apparatus 102 via an access point (AP) 103 on an infrastructure network, which is a wireless network compliant with the IEEE 802.11 series standard. Further, the communication apparatus 101 can also perform wireless communication compliant with the Wi-Fi Direct® standard with the communication apparatus 102. That is, the communication apparatuses 101 and 102 can directly communicate with each other instead of via the AP 103.

Each apparatus can also use wireless communication compliant with another wireless communication method such as Bluetooth (registered trademark), near-field communication (NFC), ultra-wideband (UWB), ZigBee, or MultiBand OFDM Alliance (MBOA) in addition to wireless communication compliant with the IEEE 802.11 series standard. UWB includes wireless Universal Serial Bus (USB), wireless 1394, and WiNET. Further, each apparatus can also use a communication method compliant with a wired communication method such as a wired local area network (LAN).

The communication apparatus 101 (a transmission apparatus) according to the present exemplary embodiment is compliant with the Wi-Fi® Miracast® Release 2 (R2) standard and shares a screen displayed on or a sound reproduced by the communication apparatus 101 with the communication apparatus 102 (a reception apparatus). Specifically, the transmission apparatus transmits image data or sound data as information of a screen displayed on or a sound reproduced by the transmission apparatus to the reception apparatus via a network, whereby the transmission apparatus and the reception apparatus share the displayed screen or the reproduced sound. This is termed "mirroring". In the Wi-Fi® Miracast® R2 standard, the communication apparatus 101 serves as a source device for transmitting one or more of a screen displayed on or a sound reproduced by the source device. Further, in the Wi-Fi® Miracast® R2 standard, the communication apparatus 102 serves as a sink device for receiving and reproducing the screen or the sound transmitted from the source device. In a case where the communication apparatuses 101 and 102 perform mirroring, the screen displayed on or the sound reproduced by the communication apparatus 101 is shared between the communication apparatuses 101 and 102.

Specific examples of the communication apparatus 101 (the source device) include a tablet, a smartphone, a personal computer (PC), a mobile phone, a camera, and a video camera. These examples are not seen to be limiting. The communication apparatus 101 need only be a communication apparatus that transmits one or more of a screen displayed on or a sound reproduced by the communication apparatus to another communication apparatus.

Further, specific examples of the communication apparatus 102 (the sink device) include a tablet, a smartphone, a PC, a mobile phone, a television, a television adapter, a set-top box, and a head-mounted display. Other specific examples of the communication apparatus 102 include a projector, a display, and an automotive navigation apparatus. These examples are not seen to be limiting. The communication apparatus 102 need only be a communication apparatus that receives and reproduces one or more of a screen displayed on or a sound reproduced by another communication apparatus.

Since the communication apparatus 101 is compliant with the Wi-Fi® Miracast® R2 standard, the communication apparatus 101 can perform mirroring via an infrastructure network in addition to mirroring via a network compliant with the Wi-Fi Direct® standard. Further, the same applies to the communication apparatus 102.

A case will be described where the communication apparatuses 101 and 102 perform mirroring via the network compliant with the Wi-Fi Direct® standard in the state where the communication apparatus 101 is the source device, and the communication apparatus 102 is the sink device. In the mirroring based on the Wi-Fi Direct® standard, the source device directly transmits (streams) a stream of image data or sound data as information of a screen displayed on or a sound reproduced by the source device to the sink device via the network. The image data is obtained by encoding the screen displayed on the source device, and the sound data is obtained by encoding the sound reproduced by the source device. Then, the sink device receives the stream of image data or sound data and displays or reproduces the stream of image data or sound data in synchronization with the source device. That is, the source device and the sink device performing mirroring share the displayed screen or the reproduced sound.

Further, a case will be described where the communication apparatus 101 (the source device) and the communication apparatus 102 (the sink device) perform mirroring via the infrastructure network. In the mirroring via the infrastructure network, the source device transmits a stream of image data or sound data to the sink device via the AP 103. The sink device receives the stream of image data or sound data via the AP 103 and displays or reproduces the stream of image data or sound data in synchronization with the source device.

Further, in addition to or instead of the mirroring, the communication apparatuses 101 and 102 can perform content redirection via the network compliant with the Wi-Fi Direct® standard or the infrastructure network. In the content redirection, the source device causes the sink device to acquire data from an external apparatus other than the source device and causes the sink device to reproduce the acquired data. At this time, the source device transmits, to the sink device, information necessary for the sink device to acquire the data from the external apparatus. The data to be acquired by the sink device is, for example, a content and includes any one of image data, document data, sound data, and video data. Additionally, the data can also include one or more of software data for reproducing these pieces of data, graphical user interface (GUI) data, or metadata.

The information to be transmitted from the source device to the sink device is information of the content present on the external apparatus. The information of the content is, for example, information of an identifier for identifying the content present on the external apparatus, a service name, location information (the Uniform Resource Identifier (URI) or the Uniform Resource Locator (URL)) of the content, and a reproduction start time (an offset). The information of the content to be received can be some of these pieces of information. The identifier of the content is an identifier for uniquely determining the content.

Further, in addition to or instead of the mirroring, the communication apparatuses 101 and 102 can perform direct streaming via the network compliant with the Wi-Fi Direct® standard or the infrastructure network. In the direct streaming, the source device transmits data stored in the source device to the sink device, and the sink device receives and reproduces the transmitted data. In this case, the source device can transmit the data to the sink device with the encoding method unchanged and without decoding the data and encoding the data again. The data to be received by the sink device is, for example, a content.

In FIG. 1, as the communication method by which the communication apparatus 101 performs mirroring, the Wi-Fi® Miracast® R2 standard is used. However, not only the Wi-Fi® Miracast® R2 standard but also another communication method such as Intel® Wireless Display (WiDi) or Apple® AirPlay® can be used. Specifically, the communication method by which the communication apparatus 101 performs mirroring may only need to be a communication method enabling wireless communication corresponding to one or more of the above mirroring, content redirection, or direct streaming. In the Wi-Fi® Miracast® R2 standard, the communication apparatus 101 performs mirroring via the network compliant with the Wi-Fi Direct® standard or the infrastructure network. This is not seen to be limiting. Alternatively, an application service platform (ASP) can also be used.

Figure 2:
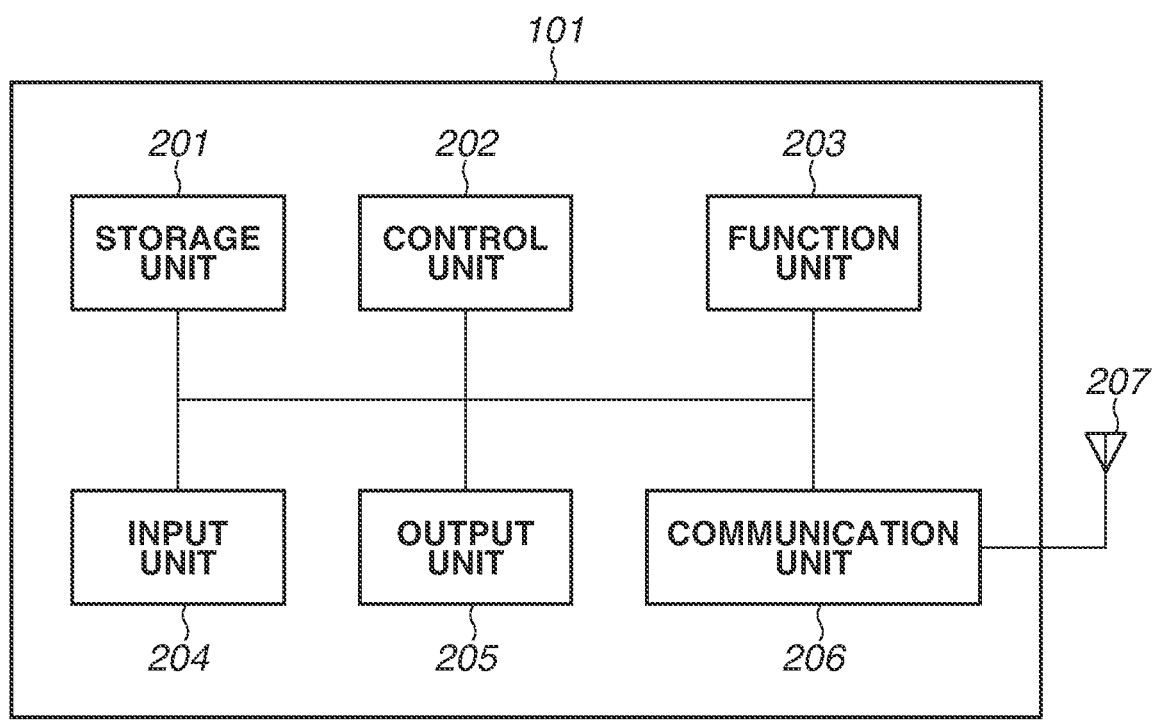
FIG. 2 is a diagram illustrating a hardware configuration of the communication apparatus.

FIG. 2 illustrates the hardware configuration of the communication apparatus 101.

The communication apparatus 101 includes a storage unit 201, a control unit 202, a function unit 203, an input unit 204, an output unit 205, a communication unit 206, and an antenna 207.

The storage unit 201 is composed of one or more memories such as a read-only memory (ROM) and a random-access memory (RAM) and stores computer programs for performing various operations described below, and various types of information such as communication parameters for wireless communication. As the storage unit 201, in addition to the memories such as the ROM and the RAM, a storage medium such as a flexible disk, a hard disk, an optical disc, a magneto-optical disc, a Compact Disc Read-Only Memory (CD-ROM), a Compact Disc Recordable (CD-R), a magnetic tape, a non-volatile memory card, or a digital versatile disc (DVD) can be used. Further, the storage unit 201 can include a plurality of memories.

The control unit 202 includes one or more processors such as a central processing unit (CPU) and a microprocessor unit (MPU) and controls the entire communication apparatus 101 by executing a computer program stored in the storage unit 201. The CPU and the MPU function as computers. The control unit 202 can control the entire communication apparatus 101 by the cooperation of a computer program stored in the storage unit 201 and an operating system (OS). Further, the control unit 202 can include a plurality of processors such as multi-core processors and control the entire communication apparatus 101 using the plurality of processors.

Further, the control unit 202 executes a computer program stored in the storage unit 201, thereby achieving a peer-to-peer (P2P) search function and a basic service set (BSS) search function. The P2P search function is the function of searching for an opposing device, which is a partner apparatus with which the communication apparatus 101 is to perform mirroring via wireless communication compliant with the Wi-Fi Direct® standard. Further, the BSS search function is the function of searching for an opposing device, which is a partner apparatus with which the communication apparatus 101 is to perform mirroring via the infrastructure network. Based on the connection state, the connection history, or various settings of the communication apparatus 101, the communication apparatus 101 determines whether to search for the opposing device by the P2P search function or search for the opposing device by the BSS search function. In addition to or instead of the mirroring, the communication apparatus 101 can search for an opposing device with which to perform content redirection or direct streaming.

Further, the control unit 202 executes a computer program stored in the storage unit 201, thereby achieving a mirroring function as the source device. The mirroring function as the source device is the function of transmitting, to the sink device, image data obtained by capturing and encoding a screen displayed on the source device or sound data obtained by encoding a sound reproduced by the source device. Further, the control unit 202 can execute a computer program stored in the storage unit 201, thereby achieving a content redirection function or a direct streaming function in addition to or instead of the mirroring function as the source device. The content redirection function as the source device is the function of transmitting, to the sink device, information necessary for the sink device to acquire a content to be reproduced by the sink device from an external apparatus other than the source device. Further, the direct streaming function as the source device is the function of transmitting a content stored in the storage unit 201 to the sink device.

Further, the control unit 202 controls the function unit 203 to execute a predetermined process such as the capturing of an image or the viewing of a content. The function unit 203 is hardware for the communication apparatus 101 to execute the predetermined process. For example, in a case where the communication apparatus 101 is a camera, the function unit 203 is an image capturing unit and performs an image capturing process. At this time, the communication apparatus 101 can cause the output unit 205 to display data generated by the image capturing unit on a screen, and transmit the data to another communication apparatus using the mirroring function of the control unit 202, thereby executing mirroring. Alternatively, the communication apparatus 101 can cause the output unit 205 to display data stored in the storage unit 201 of the communication apparatus 101 on the screen, thereby similarly executing mirroring.

The input unit 204 receives various operations from a user. The output unit 205 provides various outputs to the user through a monitor screen or a loudspeaker. The outputs provided by the output unit 205 can be a display on the screen, a sound output from the loudspeaker, or a vibration output. The monitor screen to which the output unit 205 provides the outputs is a monitor screen included in the communication apparatus 101. Alternatively, the monitor screen can be a monitor screen included in another apparatus connected to the communication apparatus 101. Both the input unit 204 and the output unit 205 can be achieved by a single module as in a touch panel. Each of the input unit 204 and the output unit 205 can be separate from the communication apparatus 101.

The communication unit 206 controls wireless communication compliant with the IEEE 802.11 series standard, controls wired communication via a wired LAN, or controls Internet Protocol (IP) communication. Further, the communication unit 206 controls the antenna 207 to transmit and receive a wireless signal for wireless communication. The communication apparatus 101 communicates image data, document data, sound data, or video data with the communication apparatus 102 via the communication unit 206.

The communication apparatus 102 has a hardware configuration similar to that of the communication apparatus 101. A storage unit 201, a function unit 203, an input unit 204, an output unit 205, a communication unit 206, and an antenna 207 of the communication apparatus 102 are similar to those of the communication apparatus 101, and therefore are not described here. Although a control unit 202 of the communication apparatus 102 is also similar to the control unit 202 of the communication apparatus 101, the differences from the control unit 202 of the communication apparatus 101 are briefly described.

The control unit 202 executes a computer program stored in the storage unit 201, thereby achieving a mirroring function as the sink device. The mirroring function as the sink device is the function of receiving, decoding, and reproducing image data obtained by capturing and encoding a screen displayed on the source device or sound data obtained by encoding a sound reproduced by the source device. Further, the control unit 202 can execute a computer program stored in the storage unit 201, thereby achieving a content redirection function or a direct streaming function in addition to or instead of the mirroring function as the sink device. The content redirection function as the sink device is the function of, based on information sent from the source device, acquiring and reproducing a content to be reproduced from an external apparatus other than the source device. Further, the direct streaming function as the sink device is the function of receiving and reproducing a content transmitted from the source device.

The communication apparatuses 101 and 102 are apparatuses that can both display an image and reproduce a sound. Both the communication apparatuses 101 and 102 can be apparatuses that one can display an image or reproduce a sound.

Figure 3:
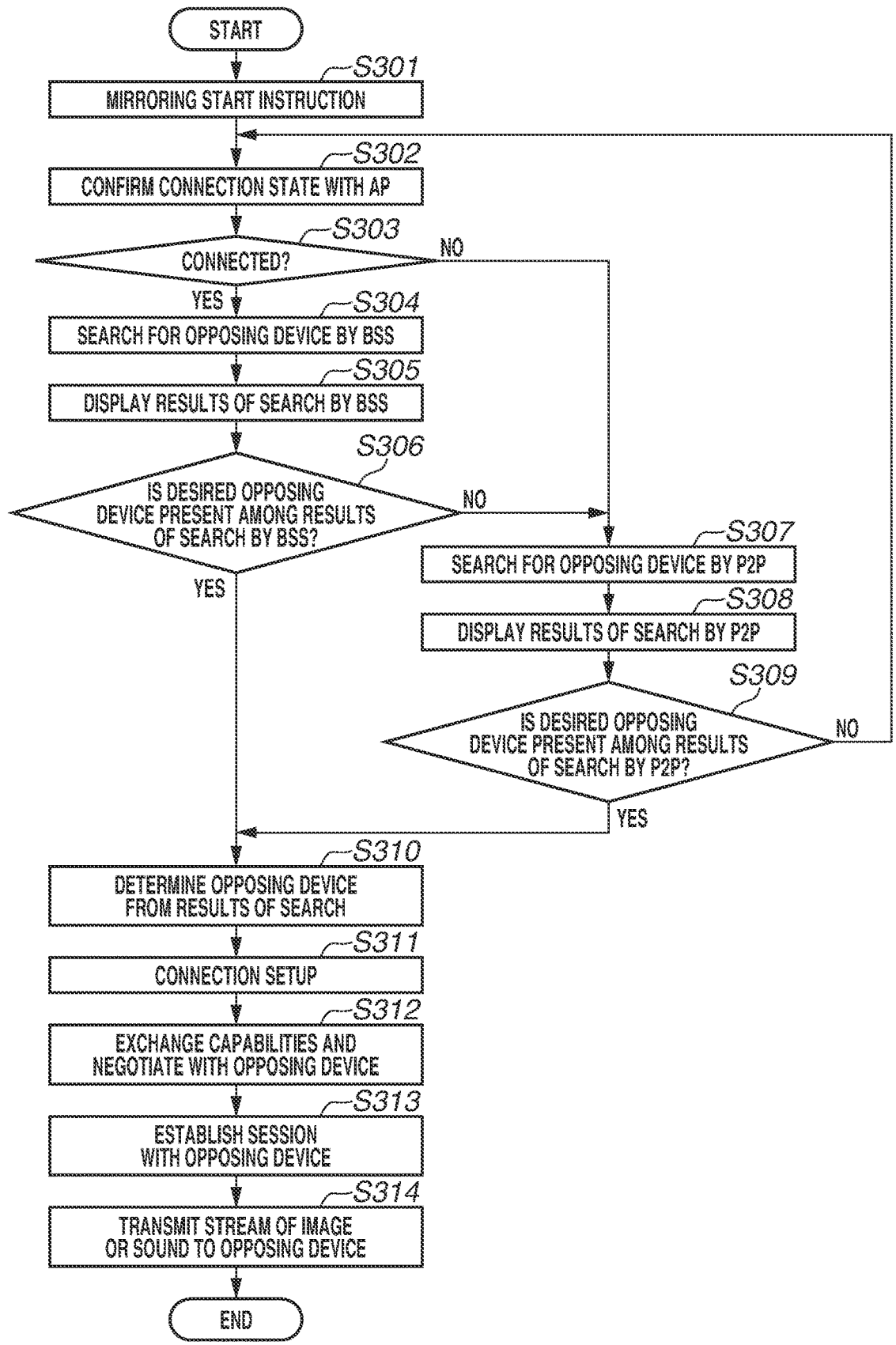
FIG. 3 is a flowchart illustrating processing executed when the communication apparatus searches for another communication apparatus and starts mirroring with another communication apparatus.

FIG. 3 illustrates a flowchart of processing achieved by the control unit 202 of the communication apparatus 101 reading and executing a computer program stored in the storage unit 201 when the communication apparatus 101 searches for the communication apparatus 102 and starts mirroring with the communication apparatus 102.

In this flowchart, the communication apparatus 101 serving as the source device searches for an opposing device with which to perform mirroring. This is not seen to be limiting. Alternatively, the communication apparatus 102 serving as the sink device can search for an opposing device with which to perform mirroring.

At least a part of the flowchart illustrated in FIG. 3 can be achieved by hardware. In a case where a part of the flowchart is achieved by hardware, a dedicated circuit can be automatically generated on a field-programmable gate array (FPGA) from a computer program for achieving each step, for example, using a predetermined compiler. Alternatively, similarly to the FPGA, a gate array circuit can be formed, and a part of the flowchart can be achieved as hardware. Yet alternatively, a part of the flowchart can be achieved by an application-specific integrated circuit (ASIC).

The processing of this flowchart is started based on the fact that a predetermined application for performing mirroring starts in the communication apparatus 101. Alternatively, the processing of this flowchart can be started based on the fact that the communication apparatus 101 is turned on. Yet alternatively, the processing of this flowchart can be started based on the fact that the communication apparatus 101 joins the infrastructure network constructed by the AP 103. Yet alternatively, the processing of this flowchart can be started based on the fact that the communication apparatus 101 establishes the network compliant with the Wi-Fi Direct® standard with the communication apparatus 102.

In step S301, based on a user operation on the input unit 204, the control unit 202 of the communication apparatus 101 receives a mirroring start instruction. Examples of the user operation performed by the user on the communication apparatus 101 in this step includes the pressing of a mirroring start menu or a control button displayed on the monitor screen of the communication apparatus 101. These examples are not seen to be limiting. Alternatively, the mirroring start instruction can be given by a user operation such as a predetermined keyboard operation, a predetermined mouse operation, a predetermined touch operation, or a predetermined joystick operation. Yet alternatively, the mirroring start instruction can be given by a user operation such as a predetermined gesture, the pressing of a control button of a remote controller, the start of the reproduction of a predetermined content, or the start-up of a predetermined application.

In step S302, the control unit 202 of the communication apparatus 101 confirms the connection state between the communication apparatus 101 and the AP 103. The confirmation method in this step can be achieved by confirming whether the communication unit 206 of the communication apparatus 101 is connected to any AP 103. Before receiving the mirroring start instruction in step S301, using setting information stored in, for example, the storage unit 201 of the communication apparatus 101 and for connecting to an AP 103 to which the communication apparatus 101 has connected in the past, the communication apparatus 101 connects to the AP 103. The setting information for connecting to the AP 103 refers to a Service Set Identifier (SSID) or a password of the AP 103. Alternatively, the communication apparatus 101 can connect to the AP 103 using setting information for connecting to an AP 103 input by the user. Based on the fact that the mirroring start operation is performed in step S301, the communication apparatus 101 can connect to the AP 103. In this case, the process of step S302 is performed after the communication apparatus 101 connects to the AP 103. Alternatively, the process of step S302 can be performed after a predetermined time elapses since the communication apparatus 101 attempts to connect to the AP 103. For example, if the setting information for connecting to the AP 103 is not set, the communication apparatus 101 cannot connect to the AP 103.

In step S303, the control unit 202 of the communication apparatus 101 determines whether the communication apparatus 101 is connected to the AP 103. This determination is made based on the confirmation of the connection state between the communication apparatus 101 and the AP 103 in step S302. If it is determined that the communication apparatus 101 is not connected to the AP 103 (No in step S303), the control unit 202 of the communication apparatus 101 performs the process of step S307. If, on the other hand, it is determined that the communication apparatus 101 is connected to the AP 103 (Yes in step S303), then in step S304, the control unit 202 of the communication apparatus 101 searches for an opposing device with which to perform mirroring by the BSS search function.

The search for the opposing device in step S304 is performed by multicast Domain Name System (DNS) (multicast DNS, mDNS) in compliance with the Wi-Fi® Miracast® R2 standard. Specifically, the search for the opposing device is performed by transmitting a DNS packet by multicast to another communication apparatus joining the infrastructure network via the AP 103 to which the communication apparatus 101 is connected. The communication apparatus 101 receives a response from an opposing device with which the communication apparatus 101 can perform mirroring via the AP 103, thereby detecting the opposing device.

Specifically, the communication apparatus 101 transmits a DNS packet including a DNS record such as a pointer (PTR) record or a service (SRV) record via the AP 103. The DNS record indicates that the communication apparatus 101 is specifying and searching for a communication apparatus with which the communication apparatus 101 can perform wireless communication compliant with the Wi-Fi® Miracast® R2 standard. Specifically, the DNS record includes either one of the service names "displaysrc", which indicates a source device, and "display", which indicates a sink device. For example, the communication apparatus 101 is the source device and searches for the sink device as the opposing device with which to perform mirroring. Thus, the communication apparatus 101 includes "display", which indicates a sink device, in the DNS record.

The communication apparatus 101 can transmit the DNS packet at any transmission intervals or any number of transmission times. In this step, the communication apparatus 101 repeatedly transmits the DNS packet up to a predetermined number of times. Then, if the communication apparatus 101 transmits the DNS packet the predetermined number of times, the communication apparatus 101 performs the process of step S305. Alternatively, the communication apparatus 101 can repeatedly transmit the DNS packet until a predetermined time elapses. If the predetermined time elapses, the communication apparatus 101 performs the process of step S305. Further, based on the fact that the communication apparatus 101 receives responses from a predetermined number of opposing devices, the communication apparatus 101 can perform the process of step S305.

Figure 4:
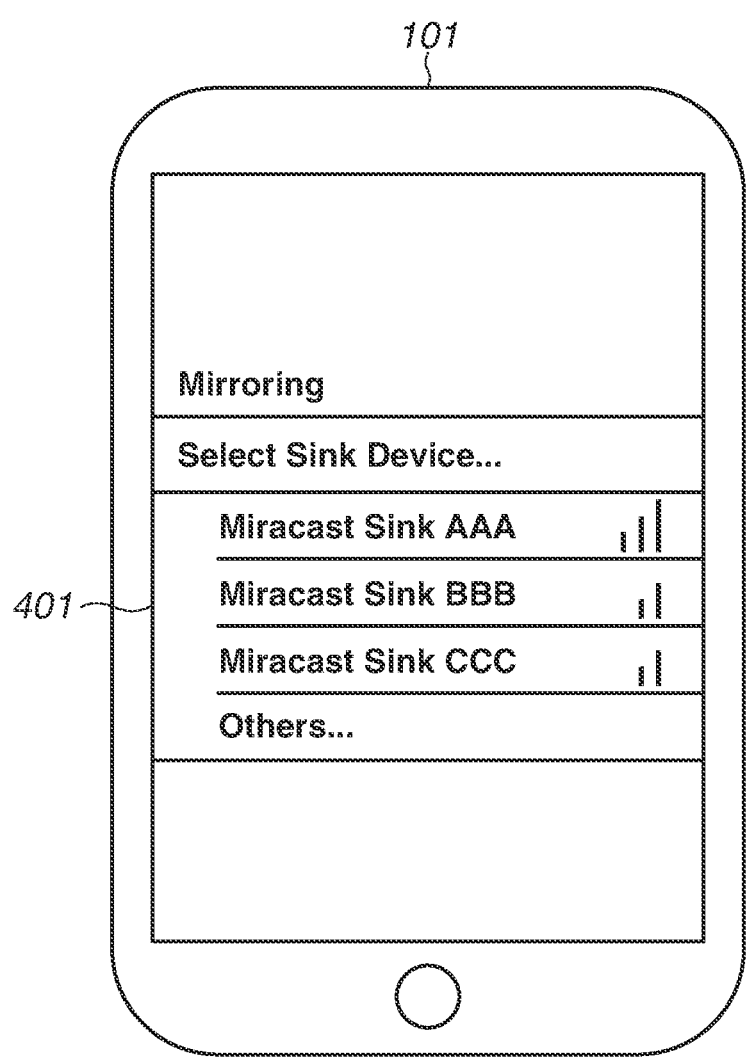
FIG. 4 is a diagram illustrating an example of a display screen displayed as a result of the communication apparatus searching for an opposing device.

In step S305, the control unit 202 of the communication apparatus 101 causes the output unit 205 to display on the monitor screen the results of searching for the opposing device by the BSS search function in step S304. FIG. 4 is a diagram illustrating an example of a display screen displayed as a result of the communication apparatus 101 searching for the opposing device. As illustrated in a search result screen 401, a message prompting the user to select an opposing device and a list of opposing devices detected as the result of the search by the BSS search function are displayed together on the display screen. The timing when the search result screen 401 is displayed is the timing when opposing devices are detected (i.e., DNS packets as responses are received from the opposing devices). Further, the display of the search result screen 401 is updated at the timing when a new opposing device is detected (i.e., a DNS packet is received from the new opposing device). Alternatively, the search result screen 401 can be periodically updated at predetermined time intervals. Further, the opposing devices in the list on the search result screen 401 can be displayed in order of detection, or in descending order of radio wave intensity, or in ascending order of distance from the communication apparatus 101.

Next, in step S306, the control unit 202 of the communication apparatus 101 determines whether a desired opposing device is present among the opposing devices detected by the BSS search function and displayed in step S305. This determination is made based on whether a selection operation for selecting an opposing device is performed by the user within a predetermined time. If the user selects a particular opposing device through the input unit 204 within the predetermined time from the list of the results of searching for the opposing device displayed on the search result screen 401 in FIG. 4, the control unit 202 of the communication apparatus 101 determines that the desired opposing device is present. Alternatively, if the user does not select an opposing device even after the predetermined time elapses, the control unit 202 of the communication apparatus 101 determines that the desired opposing device is not present.

Yet alternatively, if the user selects "others" on the search result screen 401 through the input unit 204, the control unit 202 of the communication apparatus 101 can determine that the desired opposing device is not present. Yet alternatively, in a case where the option of allowing a search for the opposing device again, such as "search again", is displayed on the search result screen 401, then based on the fact that the user selects this option, the control unit 202 of the communication apparatus 101 can determine that the desired opposing device is not present.

Further, the determination in step S306 can be made based not only on the presence or absence of a selection operation for selecting an opposing device by the user, but also on, for example, whether an opposing device to which the control unit 202 of the communication apparatus 101 has connected in the past is included in the results of searching for the opposing device by the BSS search function. Specifically, the control unit 202 of the communication apparatus 101 compares the connection history stored in the storage unit 201 with the results of the search by the BSS search function. Then, if there are opposing devices that coincide with each other, the control unit 202 of the communication apparatus 101 determines that the desired opposing device is present. Further, if there are no opposing devices that coincide with each other between the connection history stored in the storage unit 201 and the results of the search by the BSS search function, the control unit 202 of the communication apparatus 101 determines that the desired opposing device is not present.

If it is determined in step S306 that the desired opposing device is present (Yes in step S306), the control unit 202 of the communication apparatus 101 performs the process of step S310. If, on the other hand, it is determined that the desired opposing device is not present (No in step S306), the control unit 202 of the communication apparatus 101 performs the process of step S307.

In step S307, the control unit 202 of the communication apparatus 101 searches for the opposing device with which to perform mirroring by the P2P search function. The search in step S307 is performed by transmitting and receiving a beacon frame, a probe request frame, and a probe response frame in compliance with the Wi-Fi® Miracast® R2 standard. Each frame includes an information element termed a "Wi-Fi® display information element (WFD IE)" including a sub-element such as device information. For example, since the communication apparatus 101 is the source device, the communication apparatus 101 transmits a beacon, a probe request, and a probe response each including as a WFD IE a sub-element indicating that the communication apparatus 101 is a source device. In a case where an apparatus that transmits a beacon, a probe request, and a probe response is a sink device, the apparatus transmits a WFD IE including a sub-element indicating that the apparatus is a sink device. Further, in a case where an apparatus that transmits a beacon, a probe request, and a probe response can serve as both a source device and a sink device, the apparatus transmits a WFD IE including a sub-element indicating that the apparatus is a dual role device.

Next, in step S308, the control unit 202 of the communication apparatus 101 causes the output unit 205 to display on the screen the results of searching for the opposing device by the P2P search function in step S307. If the control unit 202 of the communication apparatus 101 receives a probe response and the received probe response is transmitted from an opposing device with which the communication apparatus 101 can perform mirroring, the control unit 202 of the communication apparatus 101 causes the output unit 205 to display the communication apparatus having transmitted the probe response, as the opposing device on the screen. Alternatively, if the communication apparatus 101 receives a beacon and the beacon is transmitted from an opposing device with which the communication apparatus 101 can perform mirroring, the control unit 202 of the communication apparatus 101 can cause the output unit 205 to display the communication apparatus having transmitted the beacon, as the opposing device on the screen. Since the communication apparatus 101 is the source device, an opposing device with which the communication apparatus 101 can perform mirroring is a sink device or a dual role device. A display screen displayed in step S308 is similar to that in FIG. 4. The results of the search by the P2P search function can be displayed by being distinguished from the results of the search by the BSS search function in step S305, or can be displayed by being mixed with the results of the search by the BSS search function in step S305 with no distinction. Alternatively, the control unit 202 of the communication apparatus 101 can hide the results of the search by the BSS search function and display only the results of the search by the P2P search function. After performing the process of step S308, the control unit 202 of the communication apparatus 101 performs the process of step S309 next.

In step S309, the control unit 202 of the communication apparatus 101 determines whether the desired opposing device is present among the opposing devices detected by the P2P search function and displayed in step S308. This determination is made similarly to that in step S306. If it is determined that the desired opposing device is present (Yes in step S309), the control unit 202 of the communication apparatus 101 performs the process of step S310. If, on the other hand, it is determined that the desired opposing device is not present (No in step S309), the control unit 202 of the communication apparatus 101 performs the process of step S302.

If it is determined that the desired opposing device is not present (No in step S309), the control unit 202 of the communication apparatus 101 can determine whether to continue searching for the opposing device. This determination is made based on a user instruction. For example, if the user does not select an opposing device from the results of the search displayed in step S308 within a predetermined time, the control unit 202 of the communication apparatus 101 causes the output unit 205 to display on the screen the option of continuing searching for the opposing device and the option of not continuing searching for the opposing device, thereby allowing the user to select either of the options. In this determination, if the user chooses to continue searching for the opposing device, the control unit 202 of the communication apparatus 101 determines that the control unit 202 of the communication apparatus 101 is to continue searching for the opposing device. Then, the control unit 202 of the communication apparatus 101 performs the process of step S302. If, on the other hand, the user chooses not to continue searching for the opposing device, the control unit 202 of the communication apparatus 101 determines that the control unit 202 of the communication apparatus 101 is not to continue searching for the opposing device. Then, the processing of this flowchart ends. The control unit 202 of the communication apparatus 101 can determine whether to continue searching for the opposing device based on whether a predetermined time has elapsed since the communication apparatus 101 starts searching for the opposing device, or whether the communication apparatus 101 has searched for the opposing device a predetermined number of times. In this case, if the predetermined time has elapsed since the communication apparatus 101 starts searching for the opposing device, or if the communication apparatus 101 has searched for the opposing device the predetermined number of times, the control unit 202 of the communication apparatus 101 determines that the control unit 202 of the communication apparatus 101 is not to continue searching for the opposing device. Alternatively, if the predetermined time has not elapsed since the communication apparatus 101 starts searching for the opposing device, or if the communication apparatus 101 has not searched for the opposing device the predetermined number of times, the control unit 202 of the communication apparatus 101 determines that the control unit 202 of the communication apparatus 101 is to continue searching for the opposing device.

In step S310, the control unit 202 of the communication apparatus 101 determines the opposing device with which to perform mirroring from either of the results of the search by the BSS search function displayed in step S305 and the results of the search by the P2P search function displayed in step S308. Specifically, the control unit 202 of the communication apparatus 101 determines, as the opposing device with which to perform mirroring, the opposing device selected by the user through the input unit 204 in step S306 or S309 from the list of the results of searching for the opposing device displayed on the search result screen 401 in step S305 or S308. When the determination in step S306 or S309 is made, and if a selection operation for selecting an opposing device is performed by the user within the predetermined time, the control unit 202 of the communication apparatus 101 can determine the opposing device selected by this selection operation as the opposing device with which to perform mirroring. If, besides a selection operation for selecting an opposing device by the user, the control unit 202 of the communication apparatus 101 detects an opposing device to which the communication apparatus 101 has connected in the past, the control unit 202 of the communication apparatus 101 can select the detected opposing device as the opposing device with which to perform mirroring. Alternatively, based on the past connection history, the control unit 202 of the communication apparatus 101 can determine as the opposing device a device to which the communication apparatus 101 has connected most recently. Yet alternatively, the control unit 202 of the communication apparatus 101 can determine as the opposing device a device located closest to the communication apparatus 101. In a case where the opposing device is determined based on the past connection history, the processing can proceed to the processes of this step and subsequent steps even when the user does not select an opposing device.

Next, in step S311, the control unit 202 of the communication apparatus 101 performs connection setup with the opposing device with which to perform mirroring has been determined in step S310. If the communication apparatus 101 has detected the determined opposing device with which to perform mirroring by the P2P search function, the communication apparatus 101 performs connection setup for establishing wireless communication compliant with the Wi-Fi Direct® standard with the opposing device. Further, if the communication apparatus 101 has detected the determined opposing device with which to perform mirroring by the BSS search function, the communication apparatus 101 performs connection setup for performing mirroring with the opposing device via the infrastructure network. The above connection setup is performed in compliance with the Wi-Fi® Miracast® R2 standard.

First, a case will be described where the opposing device with which to perform mirroring determined in step S310 and the communication apparatus 101 perform connection setup for establishing wireless communication compliant with the Wi-Fi Direct® standard. In this case, based on the Wi-Fi® Miracast® R2 standard, a beacon frame, a probe request frame, and a probe response frame are used for the connection setup. Further, an association request frame, an association response frame, a reassociation request frame, and a reassociation response frame can also be used. Further, a group owner (GO) negotiation request frame, a GO negotiation response frame, and a GO negotiation confirm frame can also be used. Further, a P2P invitation request and a P2P invitation response can be used. Further, a provision discovery request and a provision discovery response can be used. The connection setup for establishing wireless communication compliant with the Wi-Fi Direct® standard will be described in detail below with reference to a sequence in FIG. 6.

Next, a case will be described where the opposing device with which to perform mirroring determined in step S310 and the communication apparatus 101 perform connection setup for performing mirroring via the infrastructure network. In this case, based on the Wi-Fi® Miracast® R2 standard, the connection setup is performed by transmitting a DNS packet to the infrastructure network via the AP 103 to which the communication apparatus 101 is connected. The DNS packet includes a DNS record such as an SRV record or a text (TXT) record. Each record includes either one of the service names "displaysrc", which indicates a source device, and "display", which indicates a sink device. The connection setup for performing mirroring via the infrastructure network will be described in detail below with reference to FIG. 5.

Next, in step S312, the control unit 202 of the communication apparatus 101 exchanges capabilities and negotiates with the opposing device. The Wi-Fi® Miracast® R2 standard prescribes to use the Real Time Streaming Protocol (RTSP) for capability exchange and negotiation. The RTSP is a protocol for controlling streaming. Further, as a lower layer transport protocol, generally, the Transmission Control Protocol (TCP) is used. In the capability exchange and the negotiation, the communication apparatus 101 and the opposing device exchange predetermined RTSP M1 to M4 messages. By exchanging these RTSP messages, the communication apparatus 101 obtains capability information of the opposing device, determines parameters to be used, and notifies the opposing device of the parameters. The opposing device sets the notified parameters. Specifically, the capability information is, for example, regarding a screen, information of the resolution of a corresponding screen, the frame rate, and a codec. Further, regarding a sound, the capability information is information of a corresponding codec and the sampling frequency. As a result of the capability exchange and the negotiation in this step, parameters such as the type of the encoding method of image data or sound data to be used when the communication apparatus 101 and the opposing device perform mirroring, the resolution of an image, and the frame rate are determined. The capability information to be transmitted and received can be some of these pieces of information. For example, regarding the resolution of an image, first, the communication apparatus 101 transmits to the opposing device an M3 message including a query for the resolution of the opposing device. The opposing device transmits a message including information regarding the resolution of the screen included in the opposing device, as a response to the M3 message to the communication apparatus 101. Receiving the message, the communication apparatus 101 determines the resolution of an image to be transmitted to the opposing device based on the resolution of the screen of the opposing device.

After performing the process of the capability exchange and the negotiation, then in step S313, the control unit 202 of the communication apparatus 101 establishes a session with the opposing device. According to the Wi-Fi® Miracast® R2 standard, the communication apparatus 101 and the opposing device exchange predetermined RTSP M5 to M7 messages to establish a session. By exchanging these RTSP messages, a port number to be used is set, and a session is established. When a session is established, the opposing device can set a port number to be used by another function such as the content redirection function. Further, a plurality of port numbers can be set.

After performing the processes up to step S313, then in step S314, the control unit 202 of the communication apparatus 101 transmits a stream of image data of a screen displayed on the communication apparatus 101 or sound data of a sound reproduced by the communication apparatus 101 to the opposing device via the communication unit 206. The communication apparatus 101 starts transmitting the stream of image data or sound data to the opposing device, thereby starting mirroring. In the Wi-Fi® Miracast® R2 standard, the Real-time Transport Protocol (RTP) is used as a video streaming protocol. The RTP is a protocol for transmitting and receiving multimedia data of a moving image or a sound in real time via a network. As a lower layer transport protocol, the User Datagram Protocol (UDP) or the TCP is used.

When the control unit 202 of the communication apparatus 101 starts streaming the image data or the sound data, the processing of this flowchart ends.

By the processing of the flowchart in FIG. 3, the communication apparatus 101 can search for an opposing device by the P2P search function and search for the opposing device by the BSS search function as necessary, whereby search for the opposing device without performing an unnecessary search becomes possible. Thus, it is possible to improve the power saving performance of the communication apparatus 101. Further, the communication apparatus 101 searches for the opposing device by one of the search functions, and if a desired opposing device is detected, does not search for the opposing device by the other search function. This can shorten the search processing time. Further, in a case where the communication apparatus 101 is not connected to the AP 103, the communication apparatus 101 searches for the opposing device by the P2P search function first, whereby the user does not need to connect the communication apparatus 101 to the AP 103 before the communication apparatus 101 searches for the opposing device. Thus, it is possible to improve the power saving performance, the operability, and convenience for the user. Further, in a case where the communication apparatus 101 is not connected to the AP 103, the communication apparatus 101 searches for the opposing device by the P2P search function first. This can also shorten the search processing time.

Figure 5:
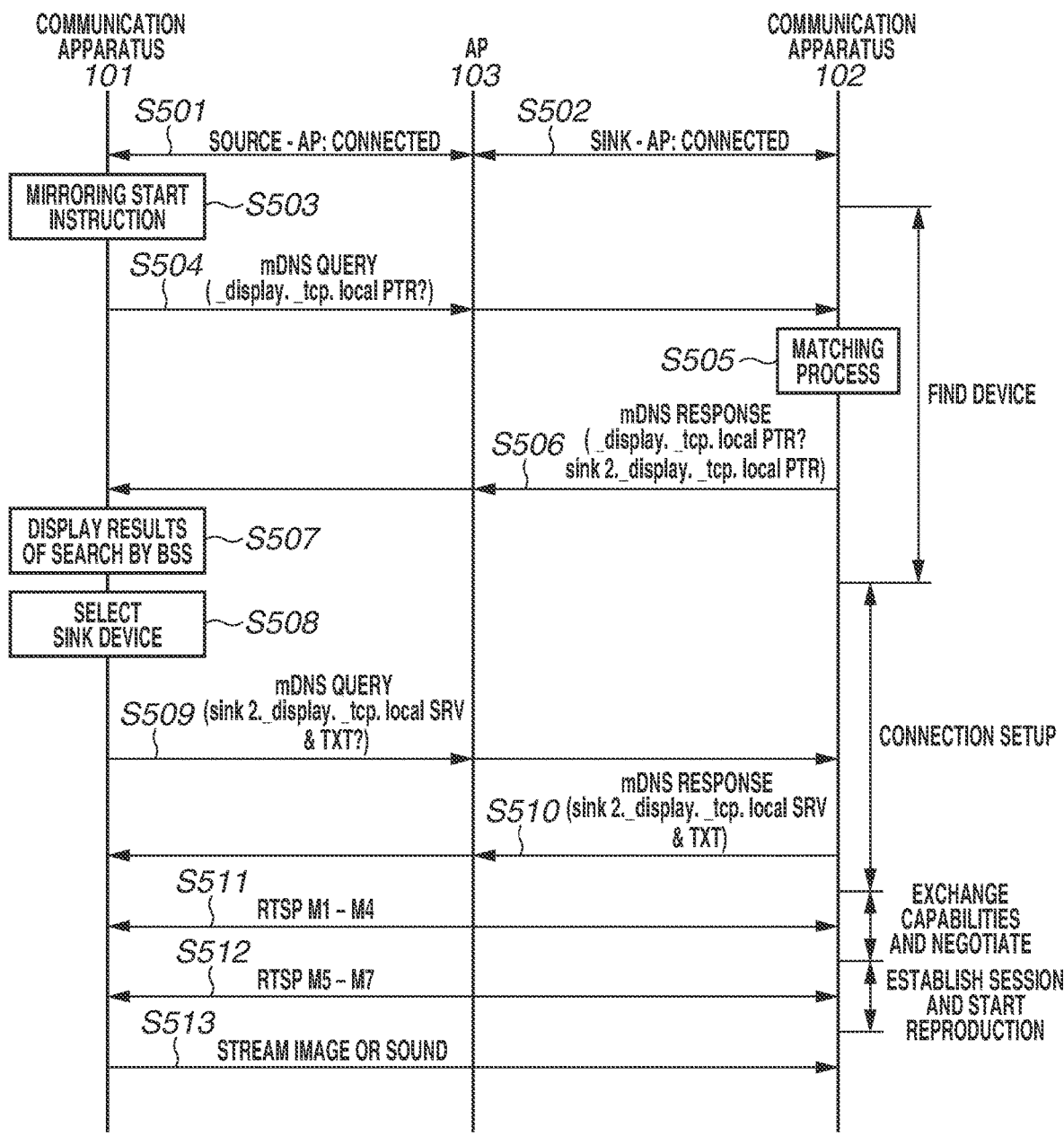
FIG. 5 is a sequence diagram illustrating processing performed when the communication apparatus searches for another communication apparatus by a basic service set (BSS) search function and connects to another communication apparatus.

FIG. 5 is a sequence diagram illustrating processing performed when the communication apparatus 101 searches for the communication apparatus 102 by the BSS search function and connects to the communication apparatus 102.

In step S501, the communication apparatus 101, which is the source device, is connected to the AP 103, thereby joining the infrastructure network constructed by the AP 103. Further, in step S502, the communication apparatus 102, which is the sink device, is also connected to the AP 103, thereby joining the infrastructure network constructed by the AP 103.

Next, in step S503, the user inputs a mirroring start instruction to the communication apparatus 101, which is the source device.

In step S504, the communication apparatus 101 searches for an opposing device by the BSS search function first. First, the communication apparatus 101 transmits an mDNS query including a PTR record name to the infrastructure network via the AP 103. By transmitting the mDNS query, the communication apparatus 101 specifies and searches for a communication apparatus with which the communication apparatus 101 can perform wireless communication compliant with the Wi-Fi® Miracast® R2 standard. Specifically, the communication apparatus 101 transmits an mDNS query including a PTR record name indicating that the communication apparatus 101 searches for the instance name (the display name) of an opposing device of a predetermined service type. In this sequence, since the communication apparatus 101 is the source device, the communication apparatus 101 searches for the sink device as the opposing device. The Wi-Fi® Miracast® R2 standard prescribes that a service type is represented by a service name and a transport protocol. Further, the Wi-Fi® Miracast® R2 standard prescribes that the service name of a sink device is "display", the service name of a source device is "display-src", and a transport protocol is represented as "tcp". Thus, the service type of the sink device is represented as "_display._tcp". Thus, the communication apparatus 101 transmits an mDNS query including "_display_tcp.local" as a PTR record name, thereby searching for an opposing device of the service type "_display._tcp". That is, by transmitting the mDNS query, the communication apparatus 101 searches for an opposing device that is the sink device in the infrastructure network constructed by the AP 103.

Receiving the mDNS query from the communication apparatus 101 via the AP 103, then in step S505, the communication apparatus 102 performs a matching process on the service type "_display._tcp". In step S506, since the communication apparatus 102 is the sink device, and the service type of the communication apparatus 102 matches the service type "_display._tcp", the communication apparatus 102 transmits an mDNS response including a PTR record to the communication apparatus 101. The PTR record provides the instance name of the communication apparatus 102. Among communication apparatuses having received the mDNS query, a communication apparatus, the service type of which does not match the service type "_display-._tcp", does not transmit an mDNS response.

Receiving the mDNS response, then in step S507, the communication apparatus 101 acquires the instance name of an opposing device from information of the PTR record included in the mDNS response and displays a list of the instance names of detected opposing devices to the user.

Next, in step S508, the user selects the communication apparatus 102 from the list of the detected opposing devices. In step S509, the communication apparatus 101 transmits an mDNS query to the communication apparatus 102 via the AP 103. The mDNS query inquires of a TXT record and an SRV record related to the instance name of the communication apparatus 102. The TXT record includes capability information of the communication apparatus 102. The capability information included in the TXT record is information regarding whether the communication apparatus 102 is a sink device, a source device, or a dual role device. The SRV record includes a port number and a host name. Receiving the mDNS query, then in step S510, the communication apparatus 102 transmits an mDNS response including the TXT record and the SRV record. Receiving this response, the communication apparatus 101 completes the search for the opposing device by the BSS search function and connection setup with the detected opposing device.

The communication apparatus 101 can continue to periodically transmit the mDNS query to be transmitted in step S504. In this case, for example, if the communication apparatus 101 receives the mDNS response in step S506, the communication apparatus 101 can transmit an mDNS query excluding the opposing device having transmitted this response from the search so that the known opposing device will not transmit an mDNS response.

In step S511, the communication apparatus 101 exchanges capabilities and negotiates with the communication apparatus 102 detected by the BSS search function. In the capability exchange and the negotiation, the communication apparatus 101 and the communication apparatus 102, which is the opposing device, exchange predetermined RTSP M1 to M4 messages. By exchanging these RTSP messages, the communication apparatus 101 obtains capability information of the communication apparatus 102, determines parameters to be used, and notifies the communication apparatus 102 of the parameters. The communication apparatus 102 sets the notified parameters.

In step S512, the communication apparatus 101 exchanges predetermined RTSP M5 to M7 messages with the communication apparatus 102, thereby establishing a session with the communication apparatus 102. When a session with the communication apparatus 102 is established, then in step S513, the communication apparatus 101 transmits a stream of image data of a screen displayed on the communication apparatus 101 or sound data of a sound reproduced by the communication apparatus 101 to the communication apparatus 102.

In the sequence in FIG. 5, when the user gives a mirroring start instruction, and if the communication apparatus 101 is connected to the AP 103, the communication apparatus 101 searches for an opposing device by the BSS search function first. If the communication apparatus 101 detects a desired opposing device by the BSS search function, the communication apparatus 101 does not perform a search by the P2P search function, whereby the communication apparatus 101 can improve the power saving performance and shorten the search processing time.

Figure 6:
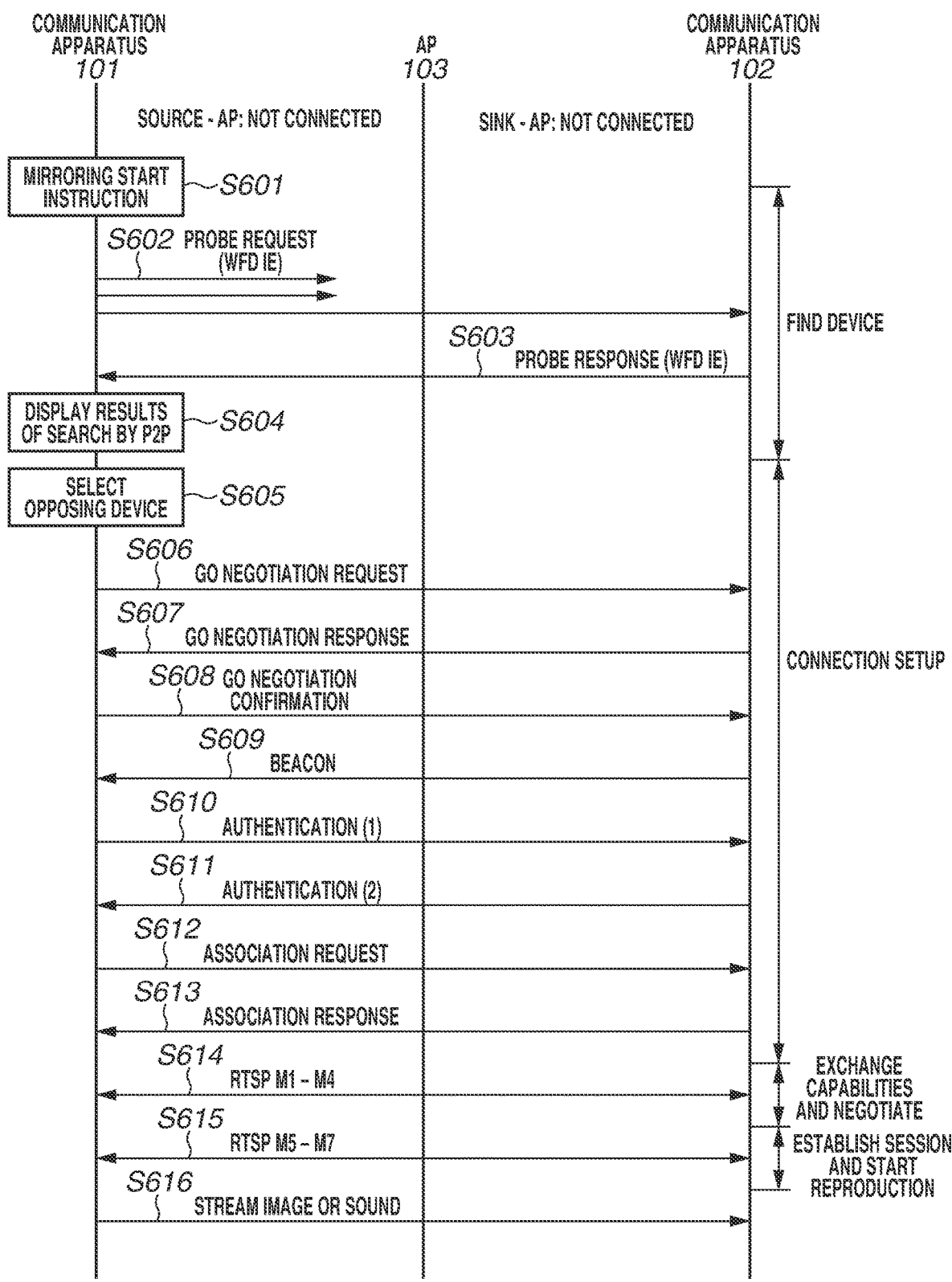
FIG. 6 is a sequence diagram illustrating processing performed when the communication apparatus searches for another communication apparatus by a peer-to-peer (P2P) search function and connects to another communication apparatus.

FIG. 6 is a sequence diagram illustrating processing performed when the communication apparatus 101 searches for the communication apparatus 102 by the P2P search function and connects to the communication apparatus 102.

Unlike the sequence in FIG. 5, this sequence is a connection sequence in a case where the communication apparatus 101 is not connected to the AP 103 when a mirroring start instruction is given to the communication apparatus 101.

In step S601, the communication apparatus 101 receives a mirroring start instruction from the user. Since the communication apparatus 101 is not connected to the AP 103, the communication apparatus 101 searches for an opposing device by the P2P search function. In step S602, first, the communication apparatus 101 transmits a probe request including a WFD IE.

If the communication apparatus 102 receives the probe request including the WFD IE, then in step S603, since the communication apparatus 102 is a device compatible with the Wi-Fi® Miracast® R2 standard, the communication apparatus 102 transmits a probe response including a WFD IE as a response.

In step S604, the communication apparatus 101 receives the probe response transmitted from the communication apparatus 102, thereby detecting the communication apparatus 102. Then, the communication apparatus 101 displays a list of detected opposing devices, thereby notifying the user of the detected opposing devices as the results of the search. The communication apparatus 101 can receive a beacon including a WFD IE transmitted from the communication apparatus 102, thereby detecting the communication apparatus 102.

In step S605, from the list of the opposing devices displayed in step S604, the user of the communication apparatus 101 selects the communication apparatus 102 as the opposing device with which to perform mirroring. The communication apparatus 101 establishes communication compliant with the Wi-Fi Direct® standard with the communication apparatus 102.

In communication compliant with the Wi-Fi Direct® standard, communication apparatuses directly perform wireless communication with each other instead of via an AP. Further, each communication apparatus performing communication compliant with the Wi-Fi Direct® standard is given a role such as a GO or a client (CL). The "GO" refers to a group owner compliant with the Wi-Fi Direct® standard and is a device serving to construct a network. Further, the "CL" refers to a device that joins the network constructed by the GO in wireless communication compliant with the Wi-Fi Direct® standard.

In step S606, to determine a GO with the communication apparatus 102, the communication apparatus 101 transmits a GO negotiation request as a role determination request to the communication apparatus 102. This signal includes an intent value indicating the degree to which the communication apparatus 101 wants to be the GO.

In step S607, the communication apparatus 102 transmits a GO negotiation response as a response to the GO negotiation request. This signal includes an intent value indicating the degree to which the communication apparatus 102 wants to be the GO. Receiving the GO negotiation response, the communication apparatus 101 compares the relative magnitudes of the intent values of the communication apparatuses 101 and 102 and determines the communication apparatus having the greater intent value as the GO. On the other hand, the communication apparatus 101 determines the communication apparatus having the smaller intent value as a CL.

In step S608, the communication apparatus 101 transmits a GO negotiation confirmation including the result of comparing the intent values to the communication apparatus 102. In the present exemplary embodiment, the intent value of the communication apparatus 102 is greater than the intent value of the communication apparatus 101, and therefore, the communication apparatus 102 becomes the GO.

Since the communication apparatus 102 becomes the GO through communication compliant with the Wi-Fi Direct® standard with the communication apparatus 101, then in step S609, the communication apparatus 102 transmits a beacon including a WFD IE.

Then, in steps S610 and S611, the communication apparatuses 101 and 102 transmit and receive authentication packets to and from each other, thereby confirming whether the communication apparatuses 101 and 102 are allowed to establish wireless communication. Then, in step S612, the communication apparatus 101 transmits an association request to the communication apparatus 102. In step S613, the communication apparatus 102 transmits an association response as a response to the received association request.

The processes of steps S614 to S616 are similar to those of steps S511 to S513 in FIG. 5.

As illustrated in FIG. 6, when the user gives a mirroring start instruction, and if the communication apparatus 101 is not connected to the AP 103, the communication apparatus 101 searches for an opposing device by the P2P search function, whereby the user does not need to connect the communication apparatus 101 to the AP 103. This saves power. Further, since it is not necessary to connect the communication apparatus 101 to the AP 103, the search processing time is shortened, and the operability and convenience for the user are improved.

Figure 7:
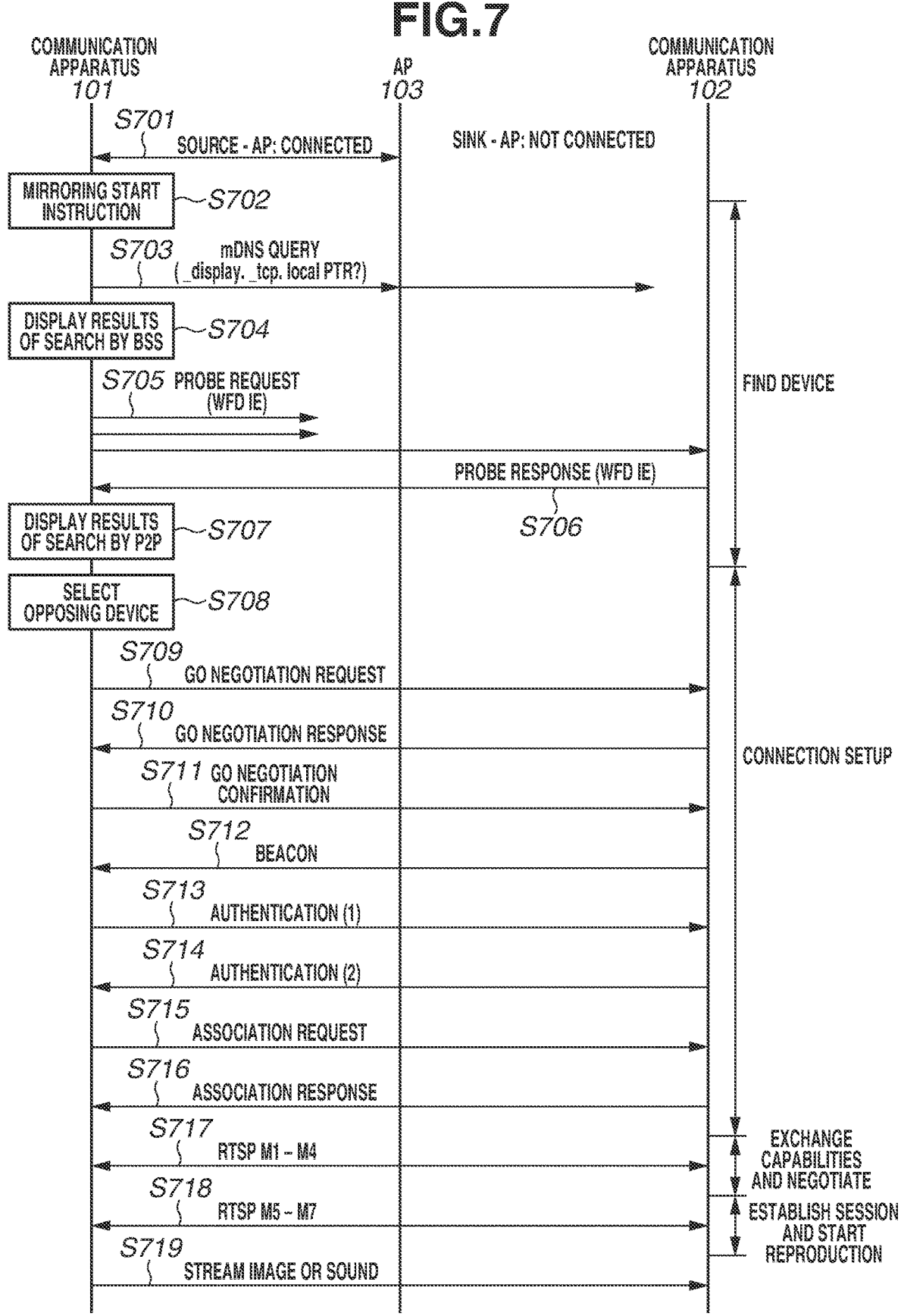
FIG. 7 is a sequence diagram illustrating processing performed when the communication apparatus searches for another communication apparatus by the BSS search function, then searches for another communication apparatus by the P2P search function, and connects to another communication apparatus.

FIG. 7 is a sequence diagram illustrating processing performed when the communication apparatus 101 searches for the communication apparatus 102 by the BSS search function, then searches for the communication apparatus 102 by the P2P search function, and connects to the communication apparatus 102.

In this sequence, when the user of the communication apparatus 101 gives a mirroring start instruction, the communication apparatus 101 is connected to the AP 103, but the communication apparatus 102 is not connected to the AP 103.

In step S701, the communication apparatus 101 is connected to the AP 103, thereby joining the infrastructure network constructed by the AP 103.

In step S702, the user of the communication apparatus 101 gives a mirroring start instruction. Since the communication apparatus 101 is connected to the AP 103, then in step S703, similarly to step S504 in FIG. 5, the communication apparatus 101 transmits an mDNS query including a PTR record to the infrastructure network via the AP 103.

Since the communication apparatus 102 is not connected to the AP 103 and cannot receive the mDNS query, the communication apparatus 102 does not return an mDNS response. In step S704, a predetermined time has elapsed since the communication apparatus 101 transmitted the mDNS query, and therefore, the communication apparatus 101 displays a list of communication apparatuses detected by the BSS search function to the user. The list displayed on the communication apparatus 101, however, does not include the communication apparatus 102. Thus, the user cannot select the communication apparatus 102 as an opposing device with which to perform mirroring.

Thus, the communication apparatus 101 searches for the opposing device by the P2P search function. The processes of steps S705 to S719 are similar to those of steps S602 to S616 in FIG. 6.

As illustrated in this sequence, when a mirroring start instruction is given, and if the communication apparatus 101 is connected to the AP 103, the communication apparatus 101 searches for an opposing device by the BSS search function. If, however, the communication apparatus 101 does not detect a desired opposing device as a result of the search for the opposing device by the BSS search function, the communication apparatus 101 can perform a search by the P2P search function, thereby detecting the desired opposing device.

In a second exemplary embodiment, if a desired opposing device is not detected by a search by the P2P search function, a search by the BSS search function is further performed.

The network configuration of a network that the communication apparatus 101 according to the present exemplary embodiment joins is similar to that in FIG. 1 in the first exemplary embodiment. Further, the hardware configuration of the communication apparatus 101 according to the present exemplary embodiment is similar to that in FIG. 2 in the first exemplary embodiment. The control unit 202 of the communication apparatus 101 according to the present exemplary embodiment executes a computer program stored in the storage unit 201, thereby achieving an AP search function. The AP search function is the function of searching for an AP 103 to which the communication apparatus 101 can connect.

Figure 8:
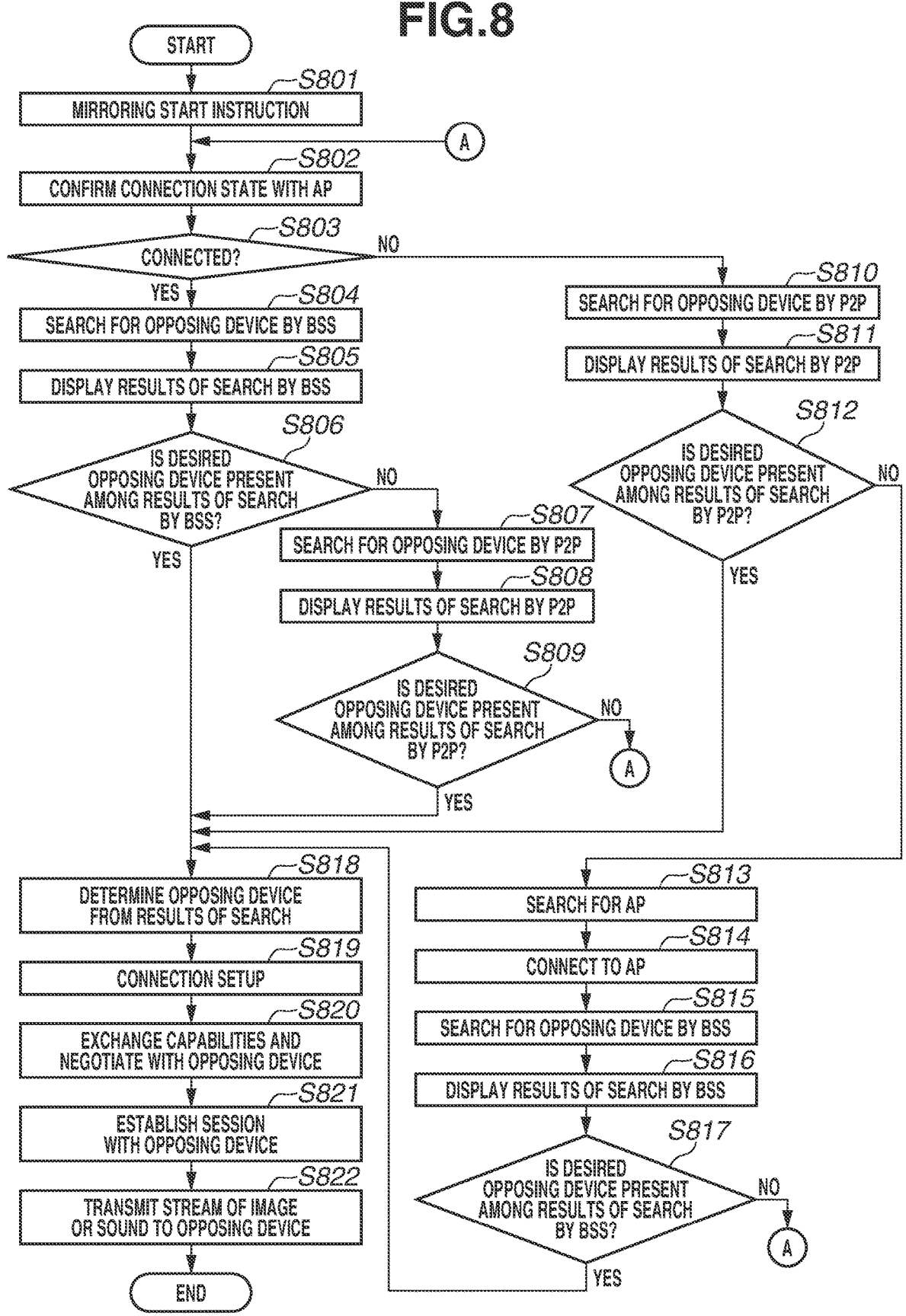
FIG. 8 is another flowchart illustrating processing executed when a communication apparatus searches for another communication apparatus and starts mirroring with another communication apparatus.

FIG. 8 is another flowchart illustrating processing executed when the communication apparatus 101 searches for the communication apparatus 102 and starts mirroring with the communication apparatus 102.

In this flowchart, the communication apparatus 101 serving as the source device searches for an opposing device with which to perform mirroring. This is not seen to be limiting. Alternatively, the communication apparatus 102 serving as the sink device can search for an opposing device with which to perform mirroring.

At least a part of the flowchart illustrated in FIG. 8 can be achieved by hardware. In a case where a part of the flowchart is achieved by hardware, a dedicated circuit can be automatically generated on an FPGA from a computer program for achieving each step, for example, using a predetermined compiler. Alternatively, similarly to the FPGA, a gate array circuit can be formed, and a part of the flowchart can be achieved as hardware. Yet alternatively, a part of the flowchart can be achieved by an ASIC.

The processing of this flowchart is started based on the fact that the predetermined application for performing mirroring starts in the communication apparatus 101. Alternatively, the processing of this flowchart can be started based on the fact that the communication apparatus 101 is turned on. Yet alternatively, the processing of this flowchart can be started based on the fact that the communication apparatus 101 joins the infrastructure network constructed by the AP 103. Yet alternatively, the processing of this flowchart can be started based on the fact that the communication apparatus 101 establishes the network compliant with the Wi-Fi Direct® standard with the communication apparatus 102.

The processes of steps S801 to S809 are similar to those of steps S301 to S309 in FIG. 3. If it is determined in step S803 that the communication apparatus 101 is not connected to the AP 103 (No in step S803), the control unit 202 of the communication apparatus 101 performs the process of step S810.

The processes of steps S810 and S811 are similar to those of steps S807 and S808.

After the process of step S811 is performed, then in step S812, the control unit 202 of the communication apparatus 101 determines whether a desired opposing device is included in the results of searching for the opposing device by the P2P search function displayed in step S811. This determination is made similarly to that in step S809. If the desired opposing device is included in the results of searching for the opposing device by the P2P search function displayed in step S811 (Yes in step S812), the control unit 202 of the communication apparatus 101 performs the process of step S818. If, on the other hand, the desired opposing device is not included in the results of searching for the opposing device by the P2P search function displayed in step S811 (No in step S812), the control unit 202 of the communication apparatus 101 performs the process of step S813.

In step S813, the control unit 202 of the communication apparatus 101 searches for an AP 103 to which the communication apparatus 101 can connect. Specifically, to search for an AP 103, the control unit 202 of the communication apparatus 101 transmits a probe request not including a WFD IE. If the AP 103 receives the probe request, the AP 103 transmits a probe response as a response to the probe request to the communication apparatus 101. The communication apparatus 101 receives the probe response, thereby detecting the AP 103.

In step S814, the control unit 202 of the communication apparatus 101 connects to the AP 103 detected as a result of performing the search in step S813. In step S813, if the communication apparatus 101 does not detect an AP 103 to which the communication apparatus 101 can connect, and a predetermined time elapses, the processing of this flowchart ends. The processes of steps S815 and S816 are similar to those of steps S804 and S805.

After performing the process of step S816, then in step S817, the control unit 202 of the communication apparatus 101 determines whether the desired opposing device is included in the results of searching for the opposing device by the BSS search function displayed in step S816. This determination is made similarly to step S806. If the desired opposing device is included (Yes in step S817), the control unit 202 of the communication apparatus 101 performs the process of step S818. If, on the other hand, the desired opposing device is not included (No in step S817), the control unit 202 of the communication apparatus 101 performs the process of step S802.

Further, the processes of steps S818 to S822 are similar to those of steps S310 to S314 in FIG. 3.

If it is determined in step S809 or S817 that the desired opposing device is not included (No in step S809 or S817), the control unit 202 of the communication apparatus 101 can determine whether to continue searching for the opposing device. This determination is made based on a user instruction. For example, if the user does not select an opposing device from the results of the search displayed in step S808 or S816 within a predetermined time, the control unit 202 of the communication apparatus 101 causes the output unit 205 to display the option of continuing searching for the opposing device and the option of not continuing searching for the opposing device to the user on the screen. Then, the determination is made based on whether the user chooses to continue searching for the opposing device or chooses not to continue searching for the opposing device between the displayed options. In this determination, if the user chooses to continue searching for the opposing device, the control unit 202 of the communication apparatus 101 determines that the control unit 202 of the communication apparatus 101 is to continue searching for the opposing device, and performs the process of step S802. If, on the other hand, the user chooses not to continue searching for the opposing device, the control unit 202 of the communication apparatus 101 determines that the control unit 202 of the communication apparatus 101 is not to continue searching for the opposing device. Then, the processing of this flowchart ends. Based on whether a predetermined time has elapsed since the communication apparatus 101 starts searching for the opposing device, or whether the communication apparatus 101 has searched for the opposing device a predetermined number of times, the control unit 202 of the communication apparatus 101 can determine whether to continue searching for the opposing device. In this case, if the predetermined time has elapsed since the communication apparatus 101 starts searching for the opposing device, or if the communication apparatus 101 has searched for the opposing device the predetermined number of times, the control unit 202 of the communication apparatus 101 determines that the control unit 202 of the communication apparatus 101 is not to continue searching for the opposing device. Alternatively, if the predetermined time has not elapsed since the communication apparatus 101 starts searching for the opposing device, or if the communication apparatus 101 has not searched for the opposing device the predetermined number of times, the control unit 202 of the communication apparatus 101 determines that the control unit 202 of the communication apparatus 101 is to continue searching for the opposing device.

Figure 9:
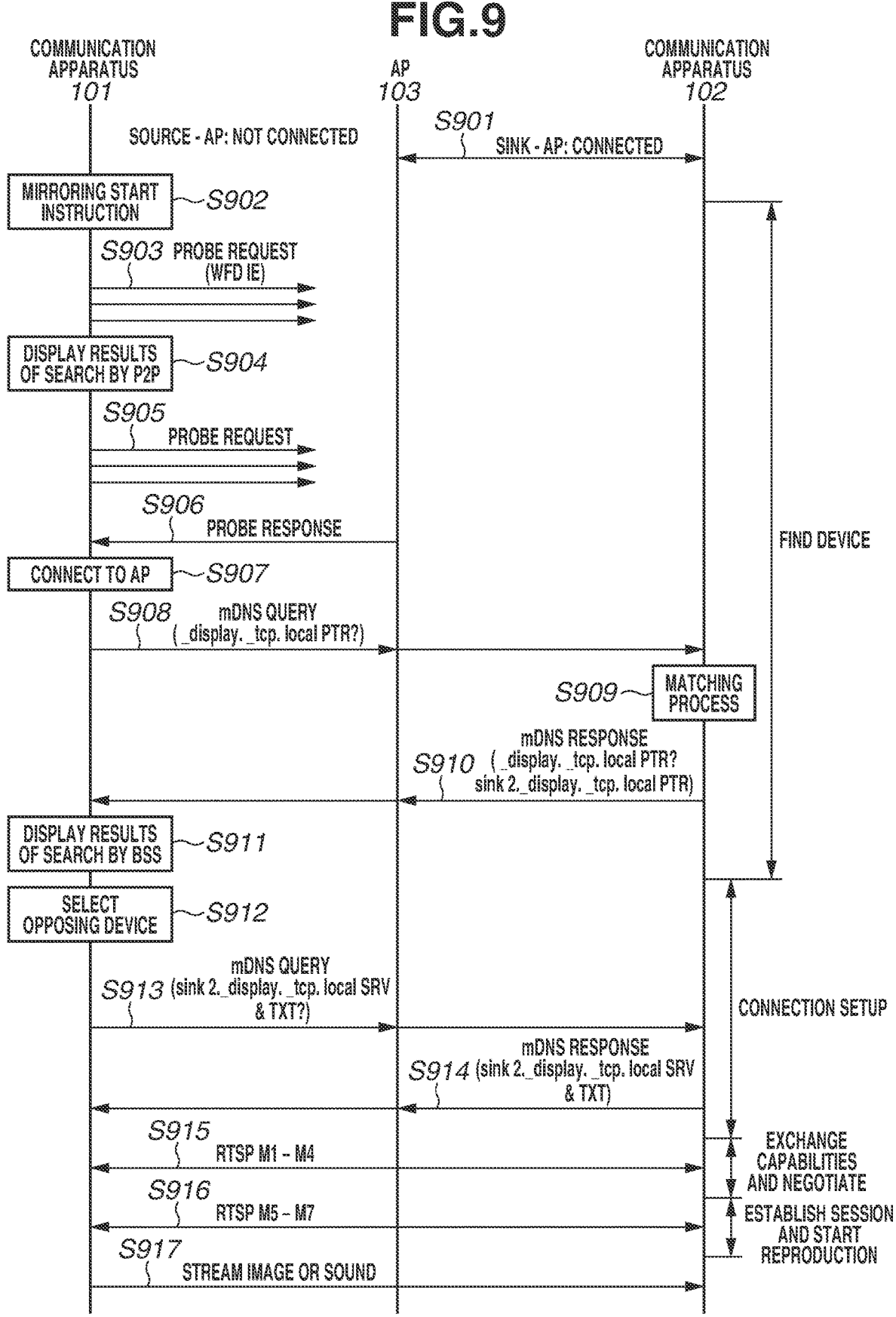
FIG. 9 is a sequence diagram illustrating processing performed when the communication apparatus searches for another communication apparatus by the P2P search function, then searches for another communication apparatus by the BSS search function, and connects to another communication apparatus.

FIG. 9 is a sequence diagram illustrating processing performed when the communication apparatus 101 searches for the communication apparatus 102 by the P2P search function, then searches for the communication apparatus 102 by the BSS search function, and connects to the communication apparatus 102.

In this sequence, when the user of the communication apparatus 101 gives a mirroring start instruction, the communication apparatus 101 is not connected to the AP 103, and the communication apparatus 102 is connected to the AP 103.

In step S901, the communication apparatus 102 is connected to the AP 103. In step S902, the user of the communication apparatus 101 gives a mirroring start instruction. Since the communication apparatus 101 is not connected to the AP 103, the communication apparatus 101 searches for an opposing device with which to perform mirroring, by the P2P search function.

In step S903, the communication apparatus 101 transmits a probe request. However, suppose that the communication apparatus 102 cannot receive the probe request, for example, due to the communication environment or settings, and therefore does not return a probe response.

In this case, in step S904, the communication apparatus 101 displays a list of communication apparatuses detected by the P2P search function to the user. The list, however, does not include the communication apparatus 102. Thus, the user cannot select from the displayed list the communication apparatus 102 as the opposing device with which to perform mirroring.

Thus, in step S905, the communication apparatus 101 transmits a probe request not including a WFD IE and searches for an AP 103 around the communication apparatus 101. In step S906, the communication apparatus 101 receives a probe response from an AP 103, thereby detecting the AP 103. In step S907, the communication apparatus 101 connects to the detected AP 103.

The communication apparatus 101 connected to the AP 103 searches for the opposing device by the BSS search function. The processes of steps S908 to S917 are similar to those of steps S504 to S513 in FIG. 5.

In the present exemplary embodiment, when a mirroring start instruction is given, and if the communication apparatus 101 is not connected to the AP 103, and a desired opposing device is not detected by a search by the P2P search function, the communication apparatus 101 searches for an AP 103 around the communication apparatus 101. Consequently, the communication apparatus 101 can connect to a detected AP 103, thereby performing a search by the BSS search function and detecting the desired opposing device.

In a third exemplary embodiment, when a mirroring start instruction is given, and if the communication apparatus 101 is not connected to the AP 103, the communication apparatus 101 searches for an opposing device by either of the BSS search function and the P2P search function according to whether the communication apparatus 101 can connect to an AP 103 to which the communication apparatus 101 has connected in the past.

The network configuration of a network that the communication apparatus 101 according to the present exemplary embodiment joins is similar to that in FIG. 1 in the first exemplary embodiment. Further, the hardware configuration of the communication apparatus 101 according to the present exemplary embodiment is similar to that in FIG. 2 in the first exemplary embodiment. The control unit 202 of the communication apparatus 101 according to the present exemplary embodiment executes a computer program stored in the storage unit 201, thereby achieving an AP search function. The AP search function is the function of searching for an AP 103 to which the communication apparatus 101 can connect.

Figure 10:
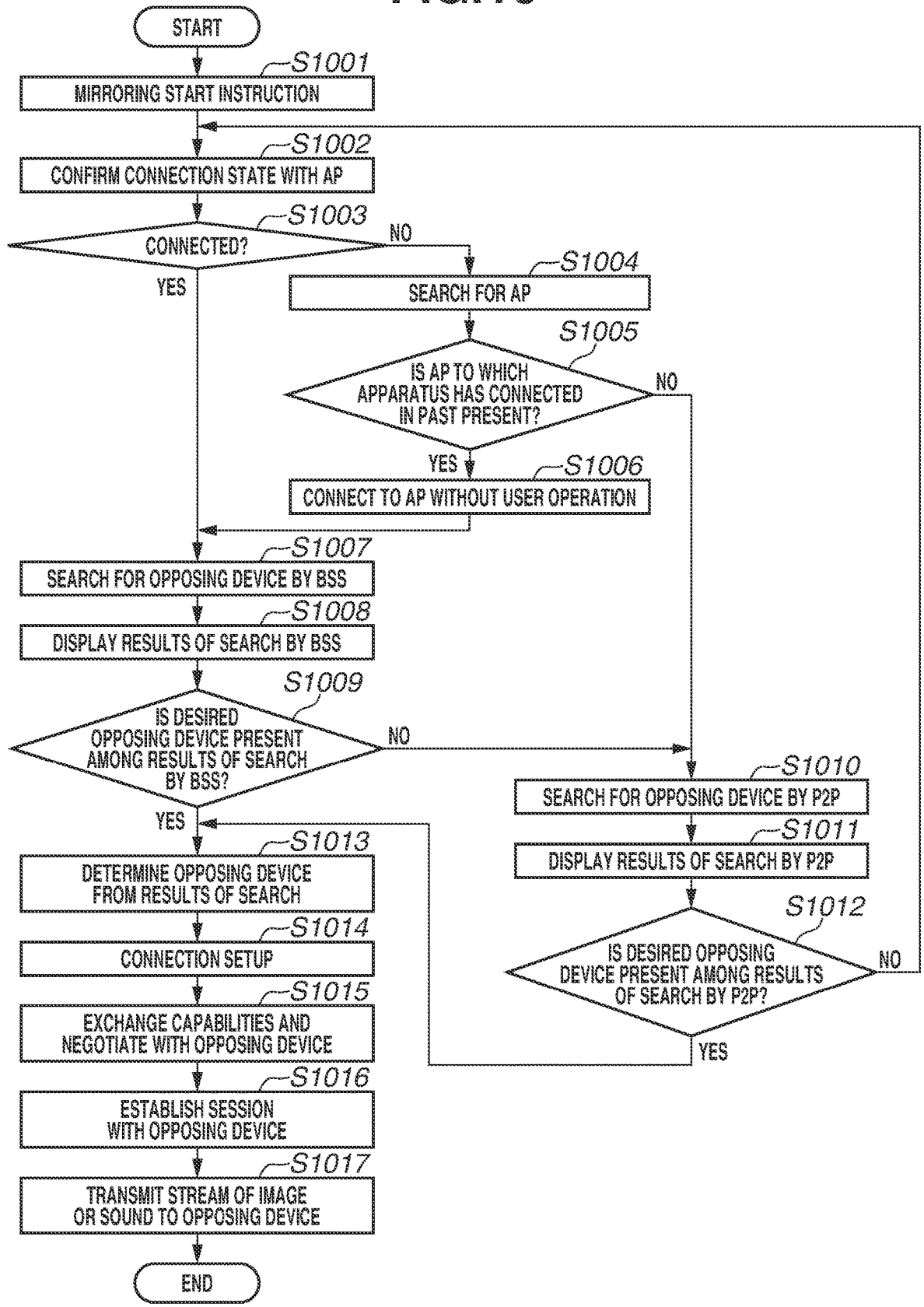
FIG. 10 is another flowchart illustrating processing executed when a communication apparatus searches for another communication apparatus and starts mirroring with another communication apparatus.

FIG. 10 is another flowchart illustrating processing executed when the communication apparatus 101 searches for the communication apparatus 102 and starts mirroring with the communication apparatus 102.

In this flowchart, the communication apparatus 101 serving as the source device searches for an opposing device with which to perform mirroring. This is not seen to be limiting. Alternatively, the communication apparatus 102 serving as the sink device can search for an opposing device with which to perform mirroring.

At least a part of the flowchart illustrated in FIG. 10 can be achieved by hardware. In a case where a part of the flowchart is achieved by hardware, a dedicated circuit can be automatically generated on an FPGA from a computer program for achieving each step, for example, using a predetermined compiler. Alternatively, similarly to the FPGA, a gate array circuit can be formed, and a part of the flowchart can be achieved as hardware. Yet alternatively, a part of the flowchart can be achieved by an ASIC.

The processing of this flowchart is started based on the fact that the predetermined application for performing mirroring starts in the communication apparatus 101. Alternatively, the processing of this flowchart can be started based on the fact that the communication apparatus 101 is turned on. Yet alternatively, the processing of this flowchart can be started based on the fact that the communication apparatus 101 joins the infrastructure network constructed by the AP 103. Yet alternatively, the processing of this flowchart can be started based on the fact that the communication apparatus 101 establishes the network compliant with the Wi-Fi Direct® standard with the communication apparatus 102.

The processes of steps S1001 to S1003 are similar to those of steps S301 to S303 in FIG. 3.

If it is determined that the communication apparatus 101 is connected to the AP 103 (Yes in step S1003), the control unit 202 of the communication apparatus 101 performs the process of step S1007. If, on the other hand, it is determined that the communication apparatus 101 is not connected to the AP 103 (No in step S1003), the control unit 202 of the communication apparatus 101 performs the process of step S1004.

In step S1004, the control unit 202 of the communication apparatus 101 searches for an AP 103 around the communication apparatus 101. The process of this step is similar to that of step S813 in FIG. 8. Next, in step S1005, the control unit 202 of the communication apparatus 101 determines whether an AP 103 to which the communication apparatus 101 has connected in the past is present among APs 103 detected in step S1004. Specifically, the control unit 202 of the communication apparatus 101 determines whether an AP 103 appearing in the connection history is present in the storage unit 201 of the communication apparatus 101. If an AP 103 appearing in the connection history is present, i.e., if an AP 103 to which the communication apparatus 101 has connected in the past is present among the APs 103 detected in step S1004 (Yes in step S1005), the control unit 202 of the communication apparatus 101 performs the process of step S1006. If, on the other hand, an AP 103 appearing in the connection history is not present, i.e., if an AP 103 to which the communication apparatus 101 has connected in the past is not present among the APs 103 detected in step S1004 (No in step S1005), the control unit 202 of the communication apparatus 101 performs the process of step S1010. In step S1005, the control unit 202 of the communication apparatus 101 can make this determination based not only on whether an AP 103 to which the communication apparatus 101 has connected in the past is present, but also on whether an AP 103 to which the communication apparatus 101 can connect is present. If an AP 103 to which the communication apparatus 101 can connect is present, the determination in step S1005 is Yes. If an AP 103 to which the communication apparatus 101 can connect is not present, the determination in step S1005 is No.

If an AP 103 to which the communication apparatus 101 has connected in the past is present among the APs 103 detected in step S1004, then in step S1006, the control unit 202 of the communication apparatus 101 autonomously connects to the AP 103 without a user operation. In this case, setting information such as a password necessary to connect to the AP 103 is stored in the storage unit 201 of the communication apparatus 101. Even in the case of an AP 103 appearing in the connection history in the storage unit 201 of the communication apparatus 101, if setting information such as a password is not stored, and the communication apparatus 101 cannot autonomously connect to the AP 103, the determination is No in step S1005.

The processes of steps S1007 to S1017 are similar to those of steps S304 to S314 in FIG. 3.

In the present exemplary embodiment, even when the communication apparatus 101 is not connected to the AP 103 when a mirroring start instruction is given, the communication apparatus 101 can autonomously connect to an AP 103 appearing in the connection history of the communication apparatus 101, thereby enabling the search for an opposing device by the BSS search function with a simple operation.

The processing of the flowcharts in FIGS. 3, 8, and 10 can be started based on the fact that not only the predetermined application for performing mirroring but also a predetermined application for performing content redirection or direct streaming starts. In this case, in steps S301, S801, and S1001, the communication apparatus 101 receives not a mirroring start instruction but a content redirection start instruction or a direct streaming start instruction from the user. Further, in FIGS. 3, 8, and 10, if a session with the opposing device is established, the communication apparatus 101 starts content redirection or direct streaming with the opposing device.

Further, in the first, second, and third exemplary embodiments, the communication apparatus 101 determines whether to search for the opposing device by the BSS search function or search for the opposing device by the P2P search function based on whether the communication apparatus 101 is connected to the AP 103. However, the determination of whether to search for the opposing device by the BSS search function first or search for the opposing device by the P2P search function first can be made based on a predetermined condition. For example, the determination of whether to search for the opposing device by the BSS search function first or search for the opposing device by the P2P search function first can be preset in the communication apparatus 101, or can be set by the user. Alternatively, if the communication apparatus 101 starts the predetermined application for performing content redirection, or if the communication apparatus 101 receives a content redirection start instruction from the user, the communication apparatus 101 can search for the opposing device by the BSS search function first. In such a case, if the communication apparatus 101 is not connected to the AP 103, the communication apparatus 101 can search for an AP 103 around the communication apparatus 101, autonomously connect to an AP 103, and search for the opposing device by the BSS search function. Alternatively, if the communication apparatus 101 cannot autonomously connect to the AP 103, the communication apparatus 101 can present a list of APs 103 around the communication apparatus 101 to the user, connect to an AP 103 by a user operation, and search for the opposing device by the BSS search function.

In the first, second, and third exemplary embodiments, the communication apparatus 101 (the source device) searches for and determines an opposing device with which to perform mirroring. Alternatively, the communication apparatus 102 (the sink device) can search for and determine an opposing device with which to perform mirroring.

In the first, second, and third exemplary embodiments, when searching for the opposing device by the BSS search function, the communication apparatus 101 searches for the opposing device using an mDNS. This is not seen to be limiting. Alternatively, the communication apparatus 101 can use Universal Plug and Play (UPnP), which searches for an opposing device using the Simple Service Discovery Protocol (SSDP). That is, the communication apparatus 101 can search for the opposing device using a communication standard for searching for a service provided by another communication apparatus via the AP 103. When searching for the opposing device by the P2P search function, the communication apparatus 101 searches for the opposing device in compliance with the Wi-Fi Direct® standard and establishes wireless communication with the detected opposing device. This is not seen to be limiting. Alternatively, the communication apparatus 101 can search for the opposing device in compliance with another wireless communication standard enabling wireless communication not via the AP 103, such as Bluetooth® or ZigBee, and establish wireless communication with the detected opposing device.

In the first, second, and third exemplary embodiments, the communication apparatus 101 displays the results of searching for the opposing device by the BSS search function or the P2P search function, for example, on the display screen in FIG. 4. As illustrated in the search result screen 401, a message prompting the user to select an opposing device is displayed on the display screen along with a list of opposing devices detected as the results of the search by the BSS search function or the P2P search function. This is not seen to be limiting. Alternatively, the communication apparatus 101 can display the detected opposing devices so that each detected opposing device can be identified as an opposing device detected by the BSS search function or an opposing device detected by the P2P search function. For example, when displaying an opposing device detected by the BSS search function, the communication apparatus 101 can indicate "BSS" together with the name of the opposing device. On the other hand, when displaying an opposing device detected by the P2P search function, the communication apparatus 101 can indicate "P2P" together with the name of the opposing device. Regarding an opposing device redundantly detected by both the BSS search function and the P2P search function, the communication apparatus 101 can indicate that the opposing device is an opposing device detected by both search functions, or can indicate that the opposing device is detected by either one of the search functions.

Further, in a case where the communication apparatus 101 is connected to the AP 103 and establishes wireless communication compliant with the Wi-Fi Direct® standard with the opposing device detected by the P2P search function, the communication apparatus 101 can disconnect the connection to the AP 103. Further, in this case, when the opposing device detected by the P2P search function is selected by the user, the communication apparatus 101 can notify the user that the connection to the AP 103 is to be disconnected. Alternatively, the communication apparatus 101 can notify the user that the connection to the AP 103 is to be disconnected, and also allow the user to choose whether or not to start establishing wireless communication compliant with the Wi-Fi Direct® standard with the opposing device selected by the user. If the user chooses not to start establishing wireless communication compliant with the Wi-Fi Direct® standard with the opposing device selected by the user, the user can be allowed to select a desired opposing device from the opposing devices detected by the BSS search function or the P2P search function again. Alternatively, the communication apparatus 101 can allow the user to select a desired opposing device only from the opposing devices detected by the BSS search function.

Further, in the first, second, and third exemplary embodiments, in a case where the communication apparatus 101 searches for the opposing device by the P2P search function, the communication apparatus 101 searches for an opposing device compliant with the Wi-Fi® Miracast® R2 standard. The communication apparatus 101, however, can search for not only an opposing device compliant with the Wi-Fi® Miracast® R2 standard but also an opposing device compliant with the Wi-Fi® Miracast® standard including the Wi-Fi® Miracast® R1 standard.

At least parts or all of the flowcharts of the communication apparatus 101 illustrated in FIGS. 3, 8, and 10 can be achieved by hardware. In a case where parts or all of the flowcharts are achieved by hardware, a dedicated circuit can be generated on an FPGA from a computer program for achieving each step, for example, using a predetermined compiler, and the generated dedicated circuit can be used. Alternatively, similarly to the FPGA, a gate array circuit can be formed, and parts or all of the flowcharts can be achieved as hardware. Yet alternatively, parts or all of the flowcharts can be achieved by an ASIC. The same applies to the sequence diagrams illustrated in FIGS. 5, 6, 7, and 9.

Further, the steps in the flowcharts illustrated in FIGS. 3, 8, and 10 and the sequence diagrams illustrated in FIGS. 5, 6, 7, and 9 can be dispersedly performed by a plurality of CPUs or apparatuses (not illustrated).

While the exemplary embodiments have been described in detail above, the present disclosure can be embodied as, for example, a system, an apparatus, a method, a program, and a recording medium (a storage medium). More specifically, the present disclosure can be applied to a system including a plurality of devices (e.g., a host computer, an interface device, an imaging apparatus, and a web application), or can be applied to an apparatus including a single device.

The present disclosure can also be achieved by the process of supplying a program for achieving one or more functions of the above exemplary embodiments to a system or an apparatus via a network or a storage medium and causing one or more processors of a computer of the system or the apparatus to read and execute the program. The present disclosure can also be achieved by a circuit (e.g., an ASIC) for achieving the one or more functions.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer can comprise one or more processors (e.g., central processing unit (CPU), micro processing unit (MPU)) and can include a network of separate computers or separate processors to read out and execute the computer executable instructions. The computer executable instructions can be provided to the computer, for example, from a network or the storage medium. The storage medium can include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to improve power saving performance of a communication apparatus that searches for another communication apparatus by a plurality of different search methods, in a case where another communication apparatus detected by one of the search methods satisfies a predetermined condition, by not searching for another communication apparatus by the other search method.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-229876, filed Nov. 30, 2017, which is hereby incorporated by reference herein in its entirety.

What is claimed is:
1. A communication apparatus comprising:
one or more processors; and
one or more memories including instructions that, when executed by the one or more processors, cause the communication apparatus to:

perform first communication that performs direct wireless communication with another communication apparatus;

perform second communication communicates with another communication apparatus via a construction apparatus for constructing a wireless network;

perform a first search process for searching for another communication apparatus communicating with the communication apparatus by the first communication;

perform a second search process for searching for another communication apparatus that supports a predetermined service and communicates with the communication apparatus by the second communication, by performing the search specifying the predetermined service by the second communication; and perform control such that:

in a case where the communication apparatus searches for another communication apparatus, based on the communication apparatus being connected to the construction apparatus, the second search process is performed, and based on the communication apparatus not being connected to the construction apparatus, the first search process is performed, and after either the first search process or the second search is performed, in a case where another communication apparatus detected by the search satisfies a predetermined condition, the other search process is not performed, and in a case where another communication apparatus detected by the search does not satisfy the predetermined condition, the other search process is performed.

2. The communication apparatus according to claim 1, wherein the execution of the instructions further cause the communication apparatus to:

share, between the communication apparatus and another communication apparatus detected by the first search process or the second search process, one or more of image data of a screen displayed on the communication apparatus or sound data of a sound reproduced by the communication apparatus.

3. The communication apparatus according to claim 2, wherein the communication apparatus shares one or more of the image data or the sound data in compliance with the Wi-Fi Miracast R2 standard.

4. The communication apparatus according to claim 2, wherein the execution of the instructions further cause the communication apparatus to:

receive a user instruction to start the sharing, wherein the communication apparatus performs the search by either the first search or the second search process based on receipt of the user instruction.

5. The communication apparatus according to claim 1, wherein the execution of the instructions further cause the communication apparatus to:

receive a user operation for selecting another communication apparatus detected in a case where one or more of the first search process or the second search process is performed, wherein the communication apparatus performs control such that in a case where the user operation for selecting another communication apparatus detected by either the first search process or the second search process is received, the other search process does not be performed, and in a case where the user operation for selecting another communication apparatus detected by the first search process or the second search process is performed.

6. The communication apparatus according to claim 5, wherein the communication apparatus performs control such that in a case where the user operation for selecting another communication apparatus detected by either the first search process or the second search process is received within a predetermined time, the other search process is not be performed, and in a case where the user operation for selecting another communication apparatus detected by the first search process or the second search process is not received within the predetermined time, the other search process is performed.

7. The communication apparatus according to claim 1, wherein the execution of the instructions further cause the communication apparatus to:

store information associated with another communication apparatus communication by the first communication or the second communication, wherein the communication apparatus performs control such that in a case where information associated with another communication apparatus detected by the first search process or the second search process matches the stored information, the other search process is not be performed, and in a case where information associated with another communication apparatus detected by the first search process or the second search process does not match the stored information, the other search process is performed.

8. The communication apparatus according to claim 1, wherein the execution of the instructions further cause the communication apparatus to:

in a case where either the first search process or the second search process is performed, receive a user operation for performing the other search process, wherein the communication apparatus performs control such that in a case where either the first search process or the second search process is performed, and the user operation is not received, the other search process is not be performed, and in a case where the user operation is received, the other search process is performed.

9. The communication apparatus according to claim 1, wherein the execution of the instructions further cause the communication apparatus to:

in a case where the communication apparatus is not connected to the construction apparatus, attempt to connect to the construction apparatus, wherein the communication apparatus performs control such that in a case where the communication apparatus is not connected to the construction apparatus, and fails to connect to the construction apparatus the first search process is performed, and in a case where the communication apparatus is connected to the construction apparatus or in a case where the communication apparatus is not connected to the construction apparatus, and successfully connects to the construction apparatus, the second search process is performed.

10. The communication apparatus according to claim 1, wherein the communication apparatus performs the first search process by transmitting a probe request including a Wi-Fi display information element in compliance with the Wi-Fi Miracast Release 2 standard.

11. The communication apparatus according to claim 1, wherein the communication apparatus performs the predetermined service which performs communication compliant with the Wi-Fi Miracast R2 standard.

12. The communication apparatus according to claim 1, wherein the communication apparatus performs the second search process searches for another communication apparatus via multicast Domain Name System (mDNS).

13. The communication apparatus according to claim 12, wherein the communication apparatus performs the second search process by transmitting a Domain Name System (DNS) packet including displaysrc or display as a service name.

14. A control method comprising:
performing direct wireless communication with another communication apparatus in a first communication;
communicating with another communication apparatus via a construction apparatus for constructing a wireless network in a second communication;
searching, in a first searching, for another communication apparatus with which to communicate via the first communication;
searching, in a second searching, for another communication apparatus that supports a predetermined service and with which the second communication is performed, by performing the search specifying the predetermined service by the second communication; and
performing control such that:
in a case where the communication apparatus searches for another communication apparatus, based on the communication apparatus being connected to the construction apparatus, the search by the second searching is performed, and based on the communication apparatus not being connected to the construction apparatus, the search by the first searching is performed, and
after the search by either the first searching or second searching is performed, in a case where another communication apparatus detected by the search satisfies a predetermined condition, the searching that did not perform the search does not perform any searches, and in a case where another communication apparatus detected by the search does not satisfy the predetermined condition, the searching that did not perform the search performs a search.

15. A non-transitory computer-readable storage medium storing a program for causing a computer to execute a method, the method comprising:
performing direct wireless communication with another communication apparatus in a first communication;
communicating with another communication apparatus via a construction apparatus for constructing a wireless network in a second communication;
searching, in a first searching, for another communication apparatus with which to communicate via the first communication;
searching, in a second searching, for another communication apparatus that supports a predetermined service and with which the second communication is performed, by performing the search specifying the predetermined service by the second communication; and
performing control such that:
in a case where the communication apparatus searches for another communication apparatus, based on the communication apparatus being connected to the construction apparatus, the search by the second searching is performed, and based on the communication apparatus not being connected to the construction apparatus, the search by the first searching is performed, and
after the search by either the first searching or second searching is performed, in a case where another communication apparatus detected by the search satisfies a predetermined condition, the searching that did not perform the search does not perform any searches, and in a case where another communication apparatus detected by the search does not satisfy the predetermined condition, the searching that did not perform the search performs a search.

* * * * *